United States Patent [19]
Cohee et al.

[11] Patent Number: 5,558,131
[45] Date of Patent: Sep. 24, 1996

[54] APPARATUS FOR BLOCKING FLUID FLOW THROUGH A CONDUIT RESPONSIVE TO AN EMERGENCY CONDITION

[75] Inventors: Donald R. Cohee, Felton; Charles Sandy; Pete Martz, both of Camden; M. James Clougherty, Felton; Robert Pauly, Bear, all of Del.

[73] Assignee: ILC Dover Incorporated, Frederica, Del.

[21] Appl. No.: 162,336

[22] Filed: Dec. 3, 1993

[51] Int. Cl.$^6$ ..................................................... F16L 55/12
[52] U.S. Cl. ................................. 138/93; 138/89; 138/46; 137/225
[58] Field of Search ................................. 138/89, 93, 40, 138/45, 46; 137/225, 320; 251/61.1; 405/37

[56] References Cited

U.S. PATENT DOCUMENTS

| | | |
|---|---|---|
| 628,726 | 7/1899 | Schultz . |
| 2,514,040 | 7/1950 | Eksergian ................................. 138/93 |
| 3,320,750 | 5/1967 | Haise et al. ............................. 138/93 |
| 3,889,045 | 6/1975 | Logsdon .................................. 138/93 |
| 3,890,994 | 6/1975 | Olsen ..................................... 138/93 |
| 3,990,464 | 11/1976 | Jenkins .................................. 138/93 |
| 4,013,097 | 3/1977 | Calandra . |
| 4,160,464 | 7/1979 | Ballinger ............................... 138/93 |
| 4,272,021 | 6/1981 | Standal ................................... 138/93 |
| 4,349,047 | 9/1982 | Ditto ..................................... 138/93 |
| 4,365,649 | 12/1982 | Jones ..................................... 138/93 |
| 4,417,598 | 11/1983 | DePirro .................................. 138/93 |
| 4,458,721 | 7/1984 | Yie et al. . |
| 4,467,835 | 8/1984 | Champleboux . |
| 4,492,095 | 1/1985 | Brister . |
| 4,545,524 | 10/1985 | Zelczer ................................... 165/22 |
| 4,565,222 | 1/1986 | Lundman . |
| 4,600,144 | 7/1986 | Zelczer ................................... 165/22 |
| 4,608,858 | 9/1986 | McKinnon . |
| 4,612,961 | 9/1986 | Vetter . |
| 4,790,313 | 12/1988 | Borrelly . |
| 4,890,483 | 1/1990 | Vetter ..................................... 138/93 |
| 5,067,850 | 11/1991 | Gray . |
| 5,170,986 | 12/1992 | Zelczer et al. ......................... 138/93 |
| 5,240,031 | 8/1993 | Vigil . |

OTHER PUBLICATIONS

Vetter Systems publication dated Feb. 1991 entitled "Pipe Sealing Plugs and Flow-Thru Test Plugs and Accessories", 5 pages.
Petersen publication dated Jan. 1990 entitled "Inflatible Pipeline Stopper Plugs and Hydraulic Flushers," 4 pages.

Primary Examiner—James E. Bryant, III
Attorney, Agent, or Firm—Louis Weinstein

[57] ABSTRACT

Fluid flow through a conduit is selectively blocked upon the occurrence of an alarm condition by an inflatable member normally folded when not in use to occupy as small a volume as is practicable. The small size volume together with securement of the inflatable member in a preferred location minimizes the effect of the inflatable member to normal fluid flow. A thin, tear-away sleeve maintains the inflatable member in the folded state and quickly tears apart during inflation enabling the inflatable member to fill and plug the interior of the conduit. The shape of the inflatable member, together with the fluid source utilized for inflation assures rapid, liquid-tight sealing. Alarm signal monitoring and inflation initiation is guaranteed under substantially all conditions through the employment of an electronic controller with a stand-by battery. The gas source serves the dual function of inflating the inflatable member and providing suitable energy for proper operation of a valve whose operation is enabled by the electronic controller. A local AC source is utilized to trickle charge the battery. The microprocessor based electronic controller incorporates routines to prevent improper and/or premature inflation. The system is designed to provide inflation in less than one minute and preferably less than thirty seconds.

34 Claims, 20 Drawing Sheets

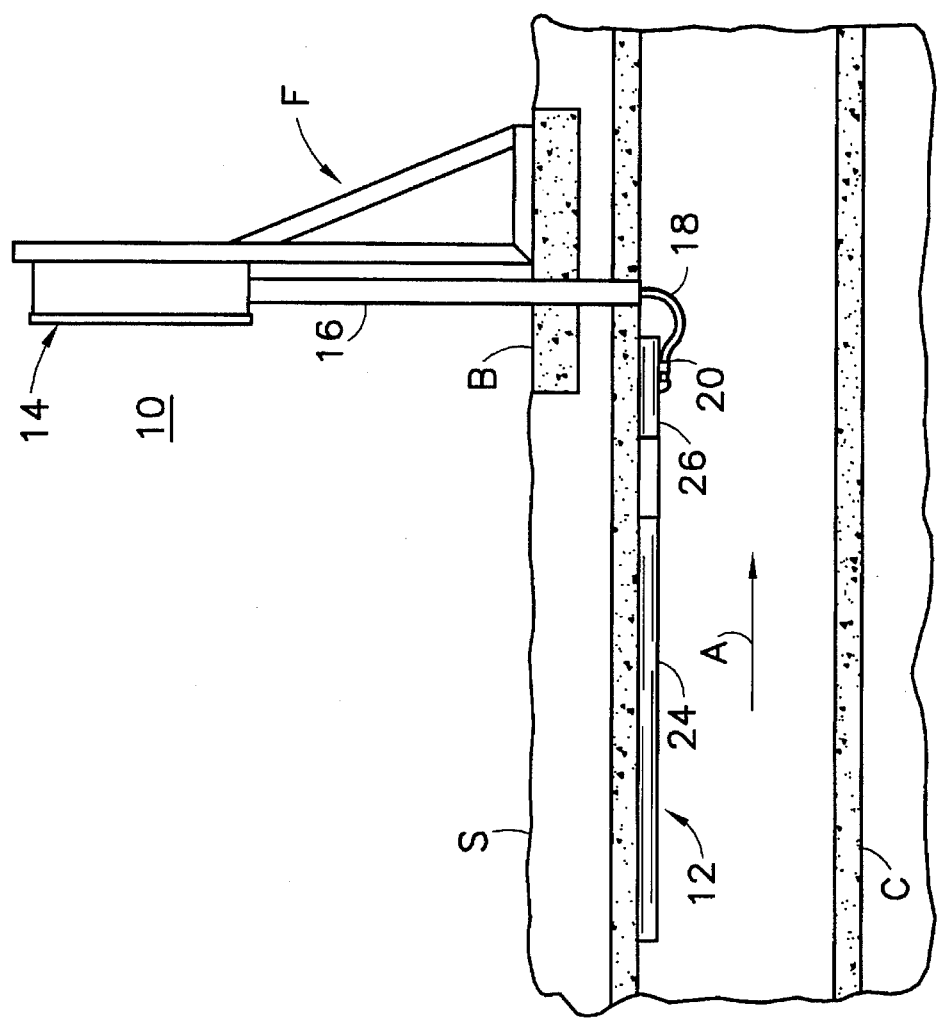
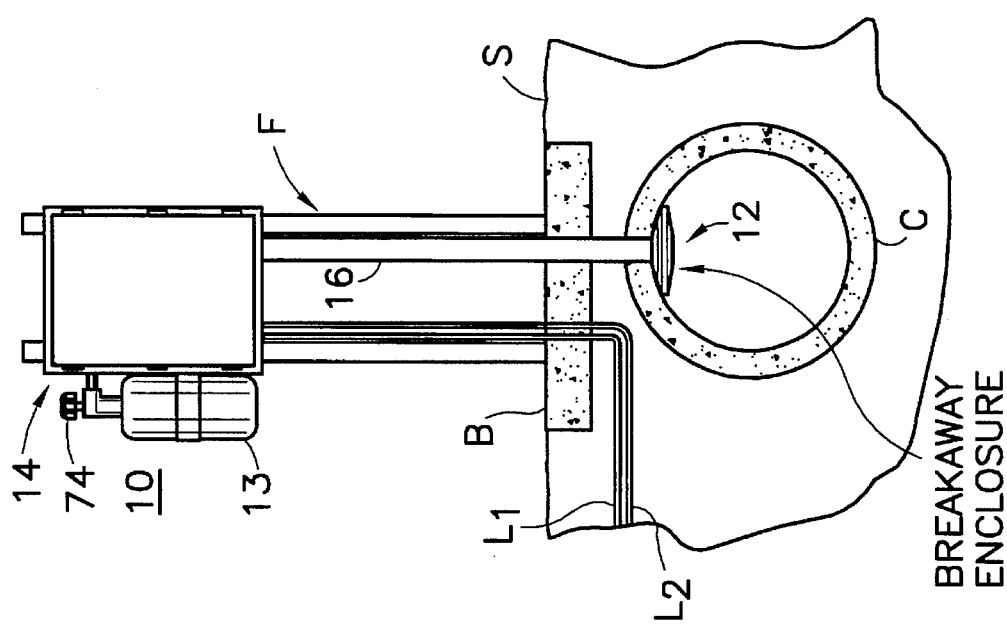
Fig. 1b
Fig. 1a

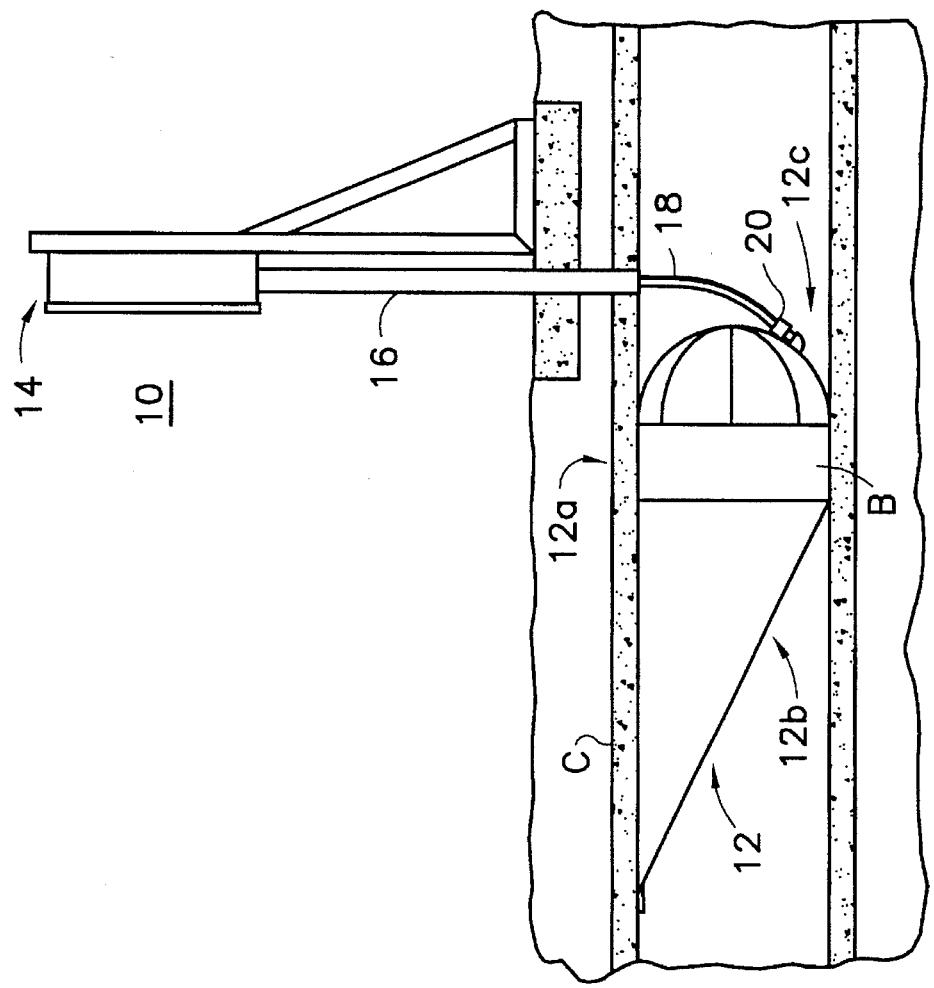
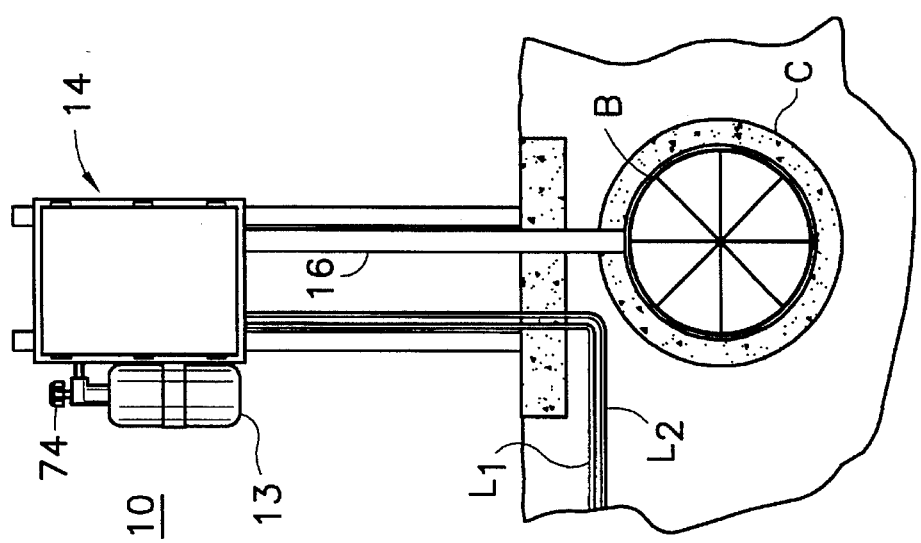
Fig. 2b
Fig. 2a

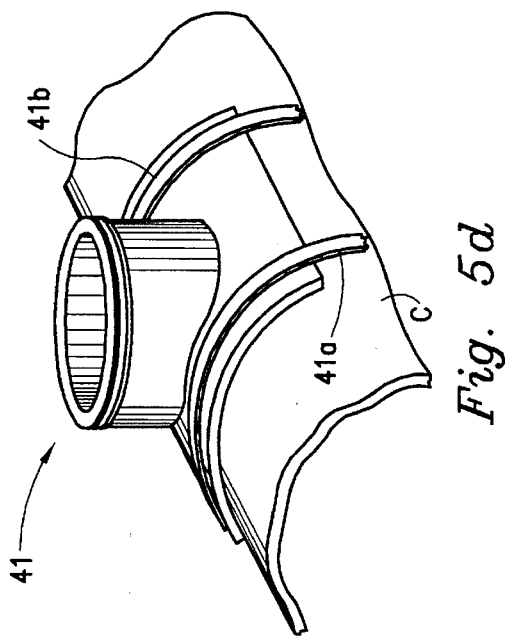
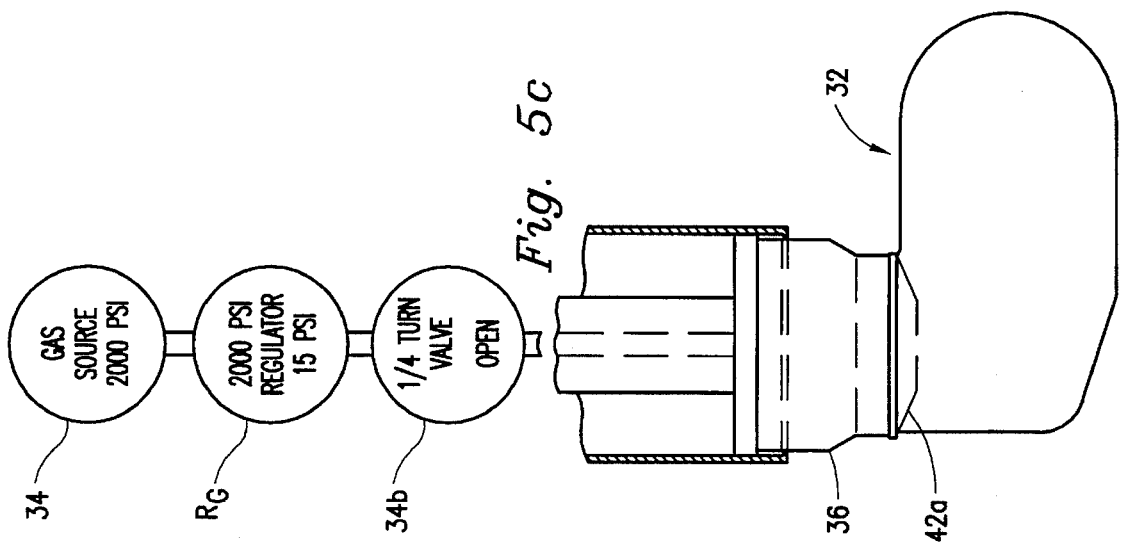
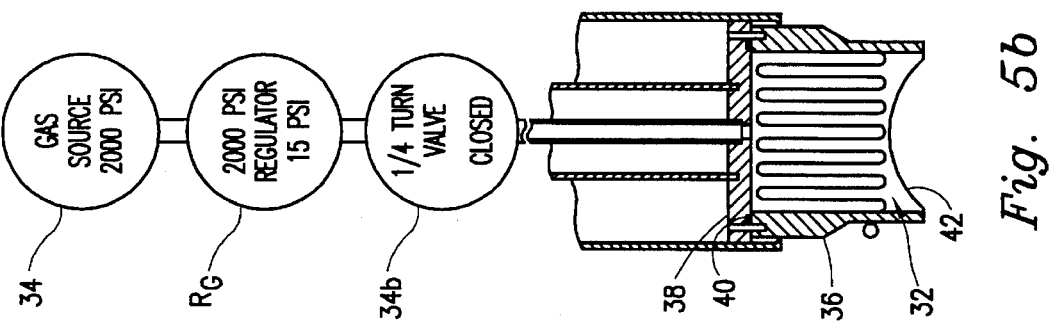

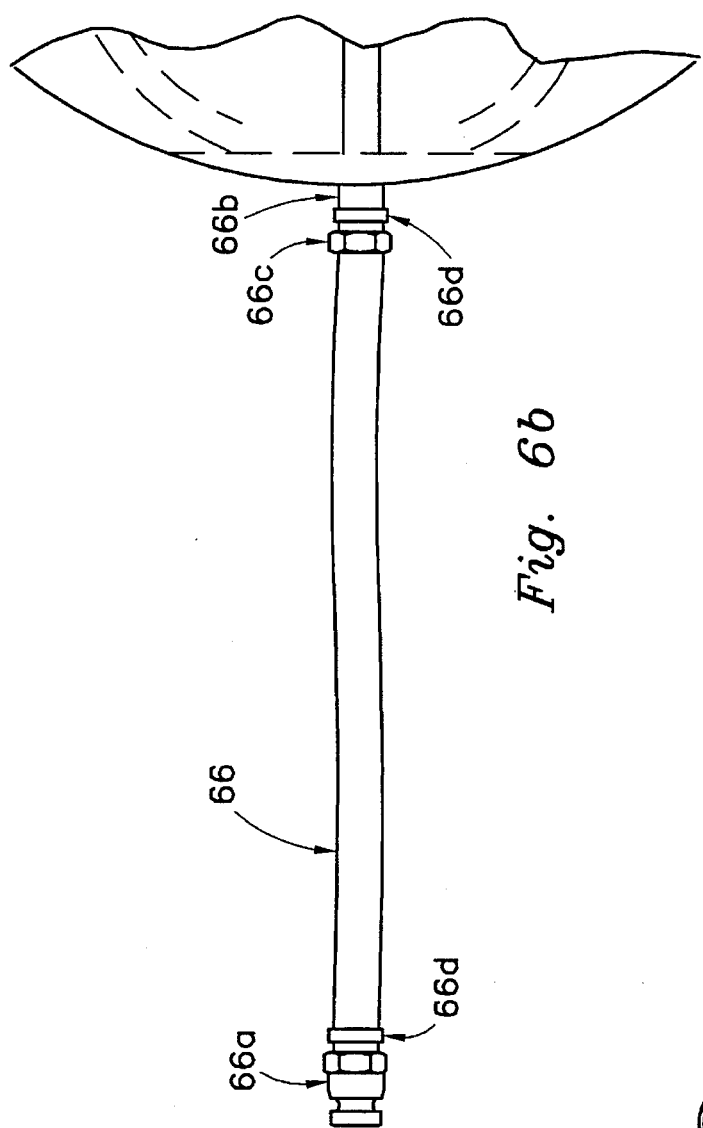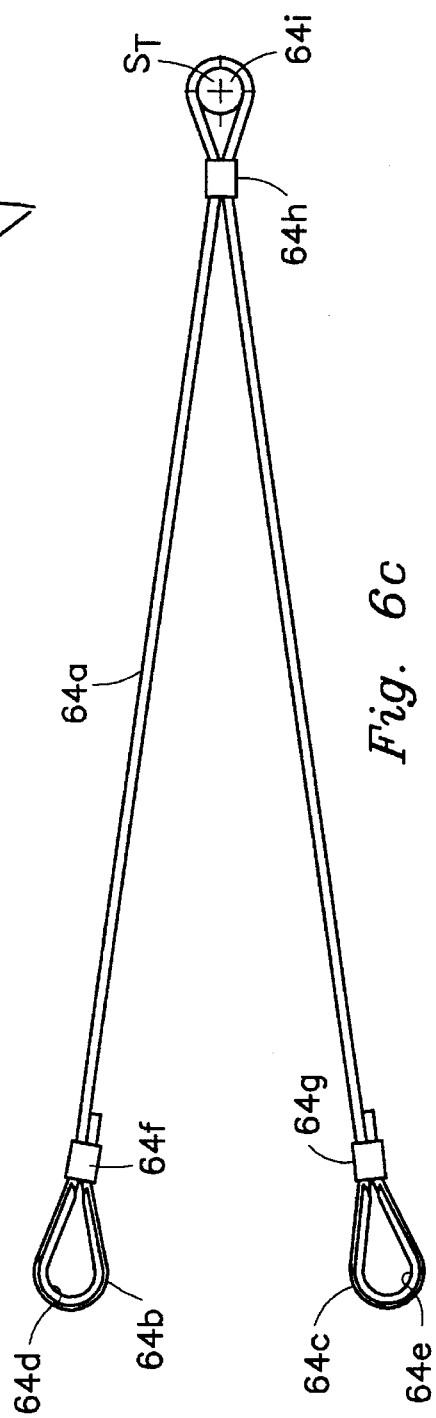
Fig. 6b
Fig. 6c

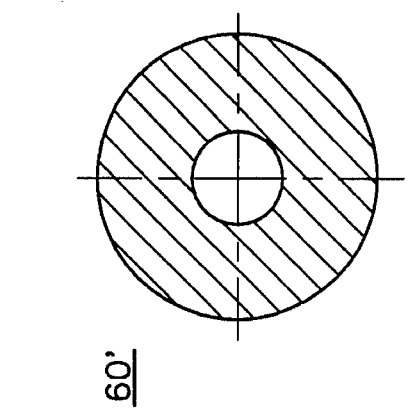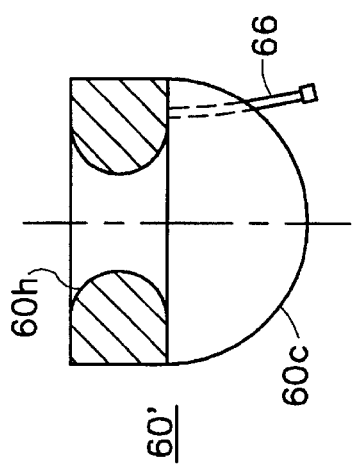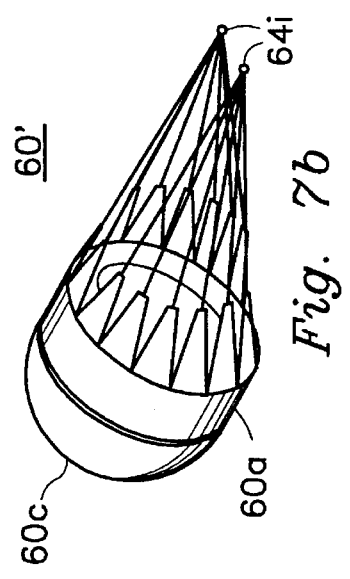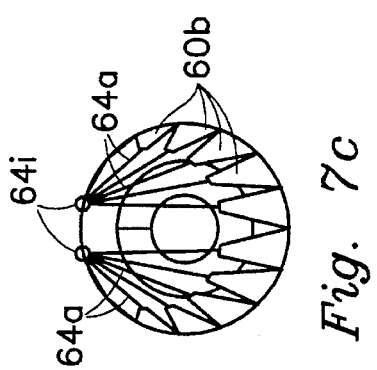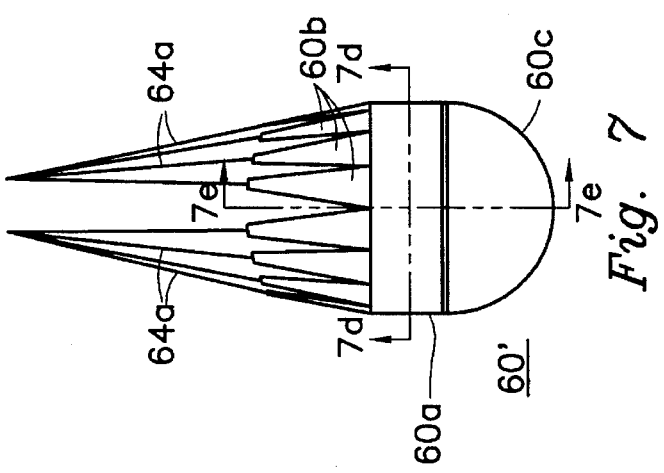

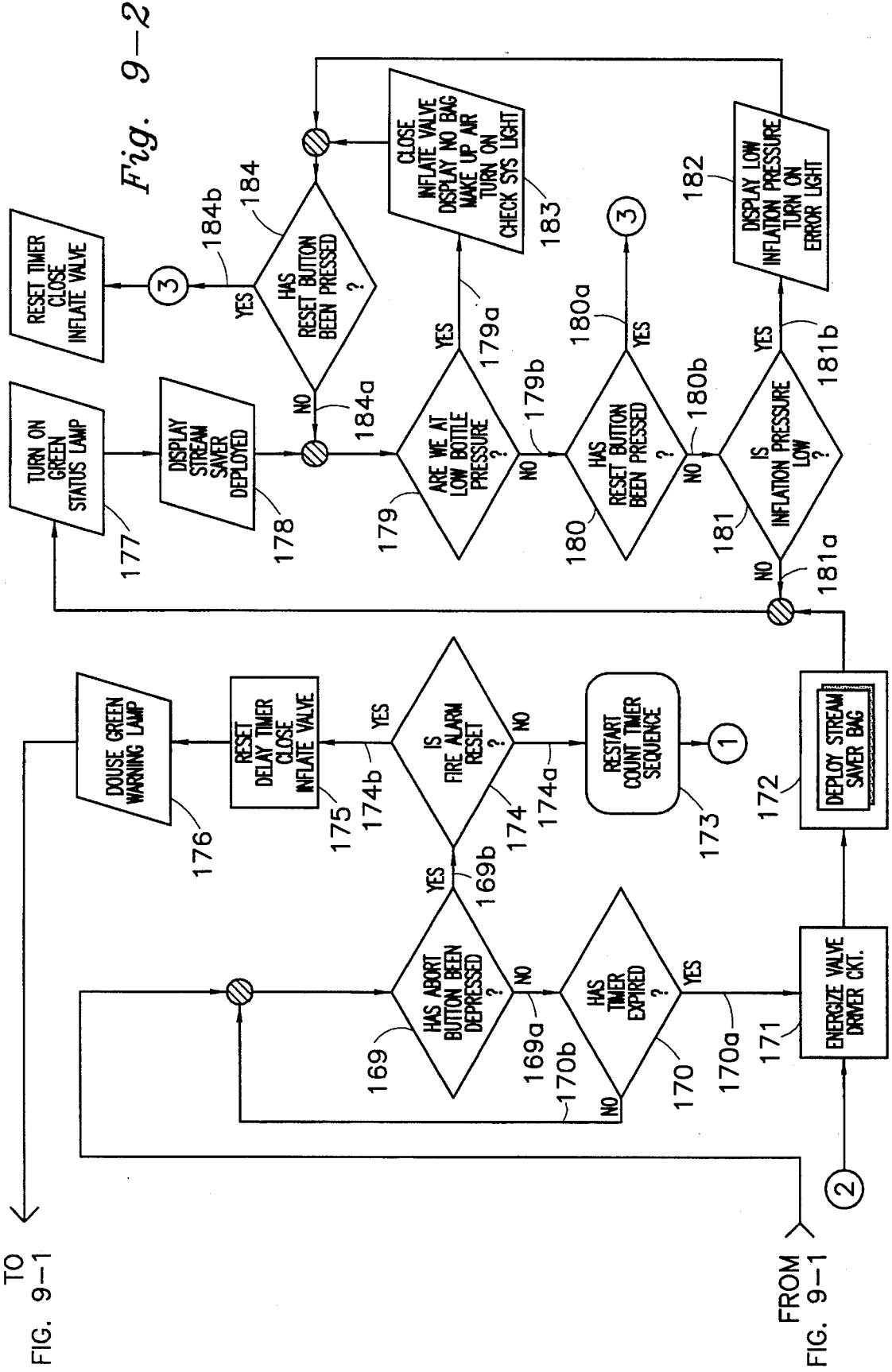

APPARATUS FOR BLOCKING FLUID FLOW THROUGH A CONDUIT RESPONSIVE TO AN EMERGENCY CONDITION

FIELD OF THE INVENTION

The present invention relates to flow blockage systems and more particularly to fully self-contained systems for blocking fluid flow and employing permanently installed inflatable members.

BACKGROUND OF THE INVENTION

Pollution prevention and/or control is of great importance to both public health and safety as well as the preservation and protection of the environment. Pollution control and especially the control of toxic substances is a growing concern worldwide and has become extremely important to protect the environment from contamination and/or destruction.

Systems conveying fluids such as water which is otherwise substantially contamination-free normally direct said fluid flow to an intermediate or final destination such that fluid flow is normally unrestrained, i.e. is neither diverted, normally diverted nor regulated nor blocked during normal conditions. However, in situations where toxic materials or the like may be introduced into a fluid flow due to an accident or man-made or natural catastrophe, it is desirous to block fluid flow at one or more locations along a conveying network in order to prevent the toxic materials from reaching certain destinations which would either cause severe harm to the environment or other significant problems such as the necessity for performing expensive cleanup operations.

It is therefore important to be able to provide apparatus capable of rapidly and reliably blocking fluid flow within a conveying conduit in a rapid and reliable manner substantially immediately upon an indication that a contaminating condition is present or may develop. It is also important to be able to promptly react to such conditions detected by sensor means located at a remote upstream location from the place at which flow blockage is to occur. It is further important to provide a system which provides either no or substantially no blockage to fluid flow during normal flow conditions and which operates automatically and without the need for human intervention.

BRIEF DESCRIPTION OF THE INVENTION

The present invention is characterized by comprising method and apparatus for selectively and automatically providing blockage of fluid flow within a conduit or the like and is characterized by employing an inflatable flexible member deployed within said conduit and preferably anchored thereto so as to maintain the inflatable member at a location which either has no effect whatsoever on normal flow or at most causes an insignificant reduction in normal fluid flow. Significantly contributing to this characteristic is the employment of an inflatable member which, in addition to being deflated during normal conditions, is folded to reduce the profile and overall volume occupied by the inflatable member to a practical minimum. The inflatable member is retained in the folded condition, preferably by a thin, lightweight, easily breakable enclosure which breaks away during inflation of the inflatable member.

In order to assure operation of the inflatable member even in the event of loss of local AC power, which loss of power may have been caused by the natural or man-made disaster also causing the contamination of fluid, the system is provided with a low-energy drain electronic controller powered by a portable DC battery which is preferably trickle charged by an AC power source during normal fluid flow conditions to assure that the system is always ready for operation in the event of an emergency.

The inflatable member is preferably formed of a rugged, lightweight, flexible fabric coated so as to be airtight and watertight. The inflatable member is formed of coated fabric pieces which are joined together along airtight and watertight seams to form an inflatable member which, when inflated, has a cylindrical-shaped intermediate portion and either conical-shaped or hemispheric-shaped end portions or a combination thereof. The embodiment comprised of conical-shaped end portions is secured at or near the upper portion of annular-shaped conduit means conveying fluid therethrough. Embodiments employing one or more hemispheric ends are provided with tabs for securement to the upper portion of the conduit means.

The inflatable member is folded in the deflated state to provide a package of minimal volume and is enclosed within a bag or enclosure which, when fully deflated, protects the inflatable member from contamination or damage due, for example, to mildew, insects and the like. The enclosure easily breaks away during inflation.

The intermediate cylindrical portion is preferably provided with a resilient compressible band which engages the interior surface of the conduit when the inflatable member is fully inflated to enhance the watertight seal. The inflatable member is inflated by a local fully self-contained inflation source such as a compressed gas container capable of maintaining full inflation for a period sufficient to clear the contaminating conditions such as, for example, a period of forty-eight hours. The gas source may, for example, be a container of a suitable compressed gas or a gas source which produces a gas under compression due to a heat or incendiary source.

As an alternative embodiment, the inflatable member may have a substantially L-shaped configuration when inflated and is stored in the lower end of a tubular member communicating with the conduit so that the inflatable member, in the collapsed condition, is substantially fully removed from the conduit during normal operation to permit unimpeded fluid flow therethrough. A membrane serves as a barrier between the fluid flow conduit and the tubular member storing the inflatable member to protect the inflatable member from contamination or damage due to insects, mildew or the like.

In another alternative embodiment, the inflatable member comprises a parachute like configuration having a hollow interior which is erected by a toroidal-shaped inflatable section. The hollow interior fills with water enhancing the watertight seal between the inflatable member and the conduit.

The fluid flow blocking system includes monitoring and control circuitry requiring very low power for proper operation over a period of the order of one day or so and is thus able to operate under control of the local rechargeable battery source referred to hereinabove.

The circuitry includes a microprocessor providing a program for continuously monitoring the presence of an alarm signal and for preventing premature or inappropriate operation in the event that the alarm signal is cleared or removed prior to a predetermined time interval. Sufficient energy to control discharge of compressed gas from the compressed gas source is obtained through a valve which controls the flow of gas from the gas source to the inflatable member. A main branch of compressed gas selectively flows to the inflatable member through the valve which is controlled by compressed gas delivered to a pneumatic control for the valve by means of a second conduit coupling compressed gas at a lower pressure level to the pneumatic control. The pneumatic control selectively receives compressed gas at a lower pressure level under control of an electrically operated solenoid.

Sensor means such as a pressure switch detects for full inflation and may be mounted within the control apparatus or directly on the inflatable member.

OBJECTS OF THE INVENTION

It is therefore one object of the present invention to provide a system for blocking fluid flow within a conduit and utilizing an inflatable member substantially permanently disposed either within the fluid flow conduit or in a location immediately adjacent and communicating therewith being rapidly inflatable to provide complete blockage of fluid flow on the occurrence of an inflation control signal.

Still another object of the present invention is to provide a novel inflatable member for blocking fluid flow within a conduit, said inflatable member being of a shape to assure stability of orientation of the inflatable member upon full inflation even in the presence of fluid flow during and after inflation and which exerts a significant pressure upon the inflated member.

Still another object of the present invention is to provide a novel inflatable member for use in a system for blocking fluid flow within a conduit, said inflatable member having a configuration which assures proper, rapid inflation during normal fluid flow and in which fluid flow of a significant pressure is exerted upon the inflatable member during such inflation.

Still another object of the present invention is to provide an apparatus and an electronic control for a system for completely blocking fluid flow within a conduit wherein the electronic control system has a very low power demand enabling operation of the system by a replaceable battery and assuring proper operation over a time period which is sufficient to cure the contaminated flow causing operation of the system or other alternative action.

Still another object of the present invention is to provide a novel system for completely blocking fluid flow through a conduit upon the occurrence of an alarm condition and further including diverting means for diverting fluid flow through a bypass branch located upstream relative to the position of the inflatable member for bypassing the flow of a contaminated fluid in addition to deployment of the inflatable member.

Still another object of the present invention is to provide a novel system for blocking fluid flow through a conduit employing an inflatable member which is folded to assume a minimum volume during normal flow conditions and is contained within an enclosure which protects the inflatable member from contamination or damage, which enclosure is easily ruptured or broken away as the inflatable member is inflated to assure rapid, proper deployment thereof.

Still another object of the present invention is to provide a system for blocking fluid flow within a conduit and comprising a compressed gas source for inflating an inflatable member to block fluid flow within the conduit, the compressed gas source also serving as the means for providing sufficient operating forces to control valve means arranged between the compressed gas source and the inflatable member.

Still another object of the present invention is to provide an apparatus and a controller for controlling operation of an inflatable member disposed within a conduit for completely blocking fluid flow therethrough upon receipt of an alarm signal and including monitors for assuring the occurrence of full inflation.

Still another object of the present invention is to provide an apparatus and a novel system for controlling blockage of fluid flow through a conduit due to the unwanted introduction of a contaminant into the fluid and incorporating microprocessor means as well as a program to protect against unwanted and/or accidental deployment of the inflatable member.

BRIEF DESCRIPTION OF THE FIGURES

The above, as well as other objects of the present invention, will become apparent when reading the accompanying description and drawings in which:

FIGS. 1a and 1b respectively show front and side views, partially sectionalized, of a flow blockage system embodying the principles of the present invention.

FIGS. 2a and 2b respectively show views substantially identical to FIGS. 1a and 1b with the inflatable member deployed.

FIGS. 5b and 5c show partially sectioned portions of the fluid blocking system of FIG. 5 in greater detail and respectively showing the inflatable member in the deflated and inflated condition.

FIG. 5d is a perspective view of a saddle T for retrofitting a system as shown in FIG. 5 to an existing conduit.

FIGS. 6, 6a and 6b respectively show top plan, elevational and sectional front views of another embodiment of an inflatable member which may be utilized in the present invention.

FIG. 6c shows one of the cable assemblies employed in the embodiment of FIGS. 6–6b.

FIG. 7 shows a top plan view of another embodiment of the present invention.

FIGS. 7a, 7b and 7c respectively show a side view, a perspective view and an end view of the embodiment of FIG. 7.

FIG. 7d is a sectional view looking in the direction of arrows 7d—7d in FIG. 7.

FIG. 7e is a sectional view looking in the direction of arrows 7e—7e of FIG. 7.

FIGS. 9-1 and 9-2, taken together, comprise is a flow diagram useful in explaining the operation of the electrical controller circuitry.

DETAILED DESCRIPTION OF THE INVENTION AND PREFERRED EMBODIMENTS THEREOF

Figure 3:
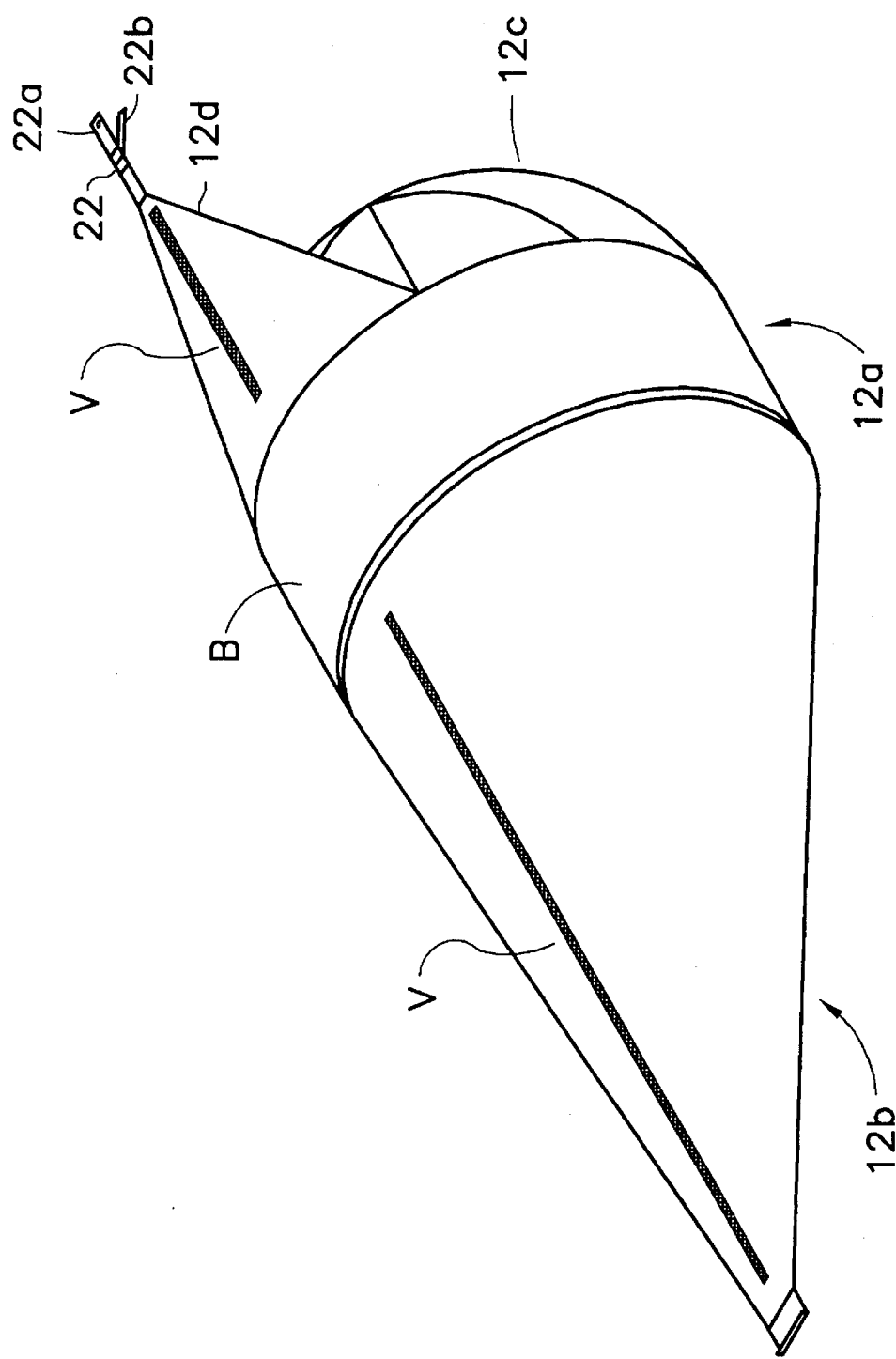
FIG. 3 is a perspective view showing the inflatable member of FIGS. 1a through 2b in greater detail.

FIGS. 1a and 1b show cross-sectional and longitudinal sectional views of a fluid flow blockage system 10 embodying the principles of the present invention and adapted to completely block fluid flow within a conduit C such as, for example, a storm drain C buried beneath the surface S for carrying fluid flow in the direction shown by arrow A. System 10 comprises an inflatable member 12 which is maintained normally deflated and, in the deflated state, is folded in such a manner as to occupy minimal volume when not in use to assure minimal and in most cases insignificant resistance to normal fluid flow. Minimal resistance to normal fluid flow is further assured by securing the inflatable member near the topmost interior portion of conduit C, as shown.

Except for the compressed gas source 13, all of the control circuitry and mechanical and electric mechanical components for coupling the source of pressurized gas, to be more fully described hereinbelow, to the inflatable member, are arranged within housing 14. Incoming lines L1 and L2 respectively carry 120 volt AC and a 24 volt DC alarm/trigger signal into housing 14. Compressed gas is coupled from the compressed gas source 13 (as will more fully be described) arranged adjacent to housing 14 through protective conduit 16 which protects a flexible tube 18 coupling compressed gas to inflatable member 12 through a coupling 20. Housing 14 is supported a predetermined distance above surface S by a support frame F arranged upon a concrete bed B.

FIGS. 2a and 2b show the system 10 of FIGS. 1a and 1b with the inflatable member 12 in the deployed state, all like elements as between FIGS. 1a and 1b and 2a and 2b being designated by like numerals.

The inflatable member 12 in the deployed state can be seen to be comprised of a substantially cylindrical-shaped intermediate portion 12a, an oblique conical section 12b and a hemispherical end section 12c.

The cylindrical portion 12a is provided with a substantially continuous band B of a suitable resilient compressible material which enhances the liquid-tight seal between the cylindrical-shaped portion 12a and the interior wall of the conduit C. However, the type and size of debris such as twigs, leaves or any other rigid or compressible objects can affect the seal. Band B may be formed of a suitable rubber or rubber-like material which may be foamed to enhance compressibility and reduce the weight of the band.

As shown in FIG. 3, the apex of the oblique cylinder portion 12b is folded over double.

An end support panel 12d has its free end coupled to an adjustable buckle 22. A strap 22a passing through buckle 22 has a reinforced rear mounting hole provided therein for securement to conduit C. A strap portion 22b may be pulled toward the right to maintain the inflatable member 12 taut in both the stowed and ultimately inflated state, which adjustment may be made after anchoring of the inflatable member by the strap described hereinabove.

The manner in which the opposite end of the inflatable member is anchored will be set forth hereinbelow in connection with FIGS. 6–6e.

The end support panel and oblique conical sections 12d and 12b are provided with Velcro strips which cooperate with complementary Velcro strips arranged within breakaway tubes 24, 26 shown in FIG. 1b.

Figure 4:
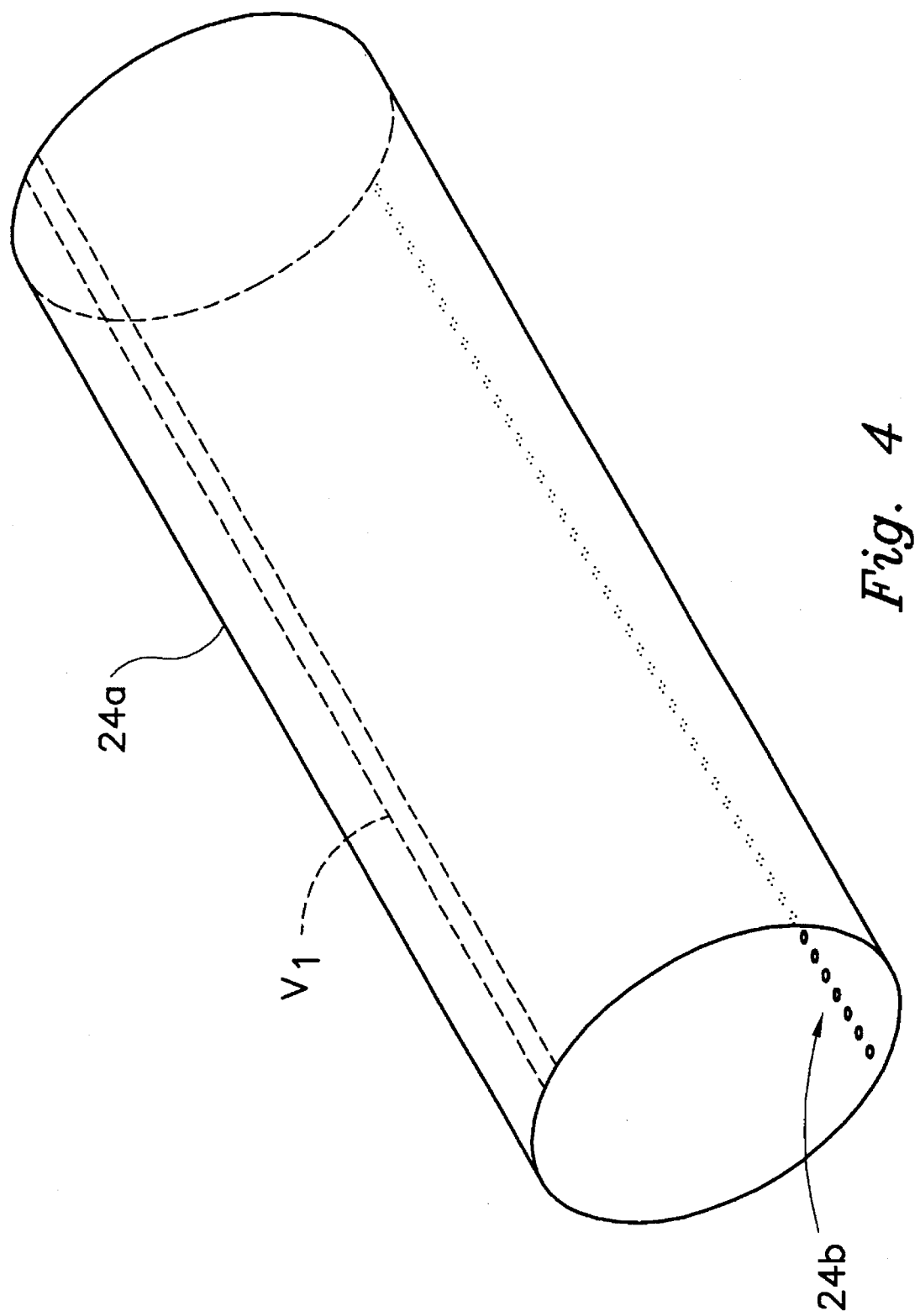
FIG. 4 is a perspective view showing a sleeve for protecting an inflatable member preparatory to use.

One typical breakaway tube is shown in greater detail in FIG. 4 and is comprised of a flexible plastic film tube 24a provided with a complementary Velcro strip V1 arranged along the interior of tube 24 and substantially aligned with its longitudinal axis. The Velcro strips V and V1 may respectively be loop-type and hook-type so as to properly interengage one another. Tube 24a is provided with a plurality of perforations 24b aligned along a straight line which is preferably substantially parallel to the longitudinal axis of tube 24a. Tube 24 is firmly encircled about the oblique conical portion of the inflatable member to retain the inflatable member in the folded state and is easily broken away from the inflatable member during the initial stages of inflation, preferably breaking apart along the perforations 24b. The only difference between tubes 24 and 26 reside in their axial length. The ends of the tubes 24 and 26 may be sealed to provide further protection for the inflatable member.

As a further alternative, the inflatable member 12 may be completely housed within an enclosure totally surrounding the inflatable member to protect the inflatable member from damage due to mildew, insects or the like, since the inflatable member may be disposed within the conduit for long periods of time before being deployed. This arrangement will be set forth hereinbelow.

The inflatable member may be formed of urethane coated nylon. A gasket surrounding the cylindrical section may be formed of neoprene rubber preferably of 50 durometer or alternatively of ethylene polytetrafluoroethylene or Viton®. One suitable thickness is ⅛ inch. The gasket material may also be neoprene foam of the closed cell type having a thickness preferably of ¼ inch.

Other materials may be used for the inflatable member and gasket so long as they are capable of providing similar operating capabilities to those described herein.

In one preferred embodiment, a gas barrier is applied to one major surface of a fabric. The gas barrier serves as the interior of the inflatable. A coating or lamination is provided on the opposite major surface of the fabric, which coating or lamination is a chemically resistant compound such as a polyethylene film or polytetrafluoroethylene (TEFLON®). An intermediate coating is provided between the fabric and the chemically resistant coating (or film) to obtain a desired adhesion. Seams between adjacent coated fabric pieces making up the inflatable are sewn to achieve the desired structural strength. The sewn seams are overlapped, i.e.

sealed with a film to provide a suitable gas seal along the sewn portions, which film is adhered to the coated fabric by a heat sealing process.

As an alternative to forming the inflatable member of an airtight, watertight coated fabric, the inflatable member may be formed of a fabric provided with a rubber or rubber-like inflatable bladder. In the latter case, the outer fabric member limits the overall volume to which the inflatable member may be inflated, in much the same way as the first described embodiment. The outer member of the last-described embodiment is preferably coated or otherwise treated in a manner similar to that described above, for example, to withstand deterioration and provide suitable strength to protect against breakage or tearing.

Figure 3B:
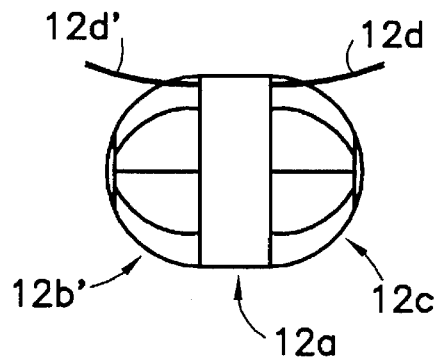
FIGS. 3a, 3b and 3c show elevational views of other embodiments of the inflatable member shown in FIG. 3.
Figure 3C:
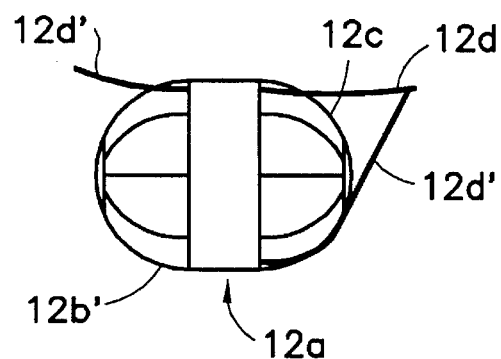
Figure 3A:
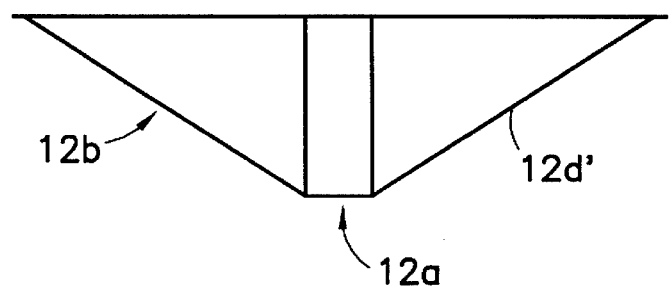

FIGS. 3a, 3b and 3c show other alternative embodiments for the inflatable member of FIG. 3.

FIG. 3a showing an embodiment in which the hemispheric upstream end 12c of FIG. 3 is replaced by an oblique conical section 12c'.

In FIGS. 3b and 3c, the oblique conical section 12b is replaced by an upstream hemispherical section 12b' and an end support panel 12d' substantially identical in design and configuration to the end support panel 12d of FIG. 3. The embodiment of FIG. 3c differs from that shown in FIG. 3b in that the upstream hemispheric section 12c is provided with upper and lower end support panels 12d and 12d' for anchoring the upstream end of the inflatable member to the conduit C.

FIGS. 5, 5a, 5b and 5c show partially sectionalized views of another embodiment of the present invention utilizing an inflatable member having a substantially L-shaped configuration, which may be a drain pipe or the like buried below surface S. A T-connector 28 communicates the interior of conduit C with a vertically aligned tubular housing 30 which, together with housing 31, houses inflatable member 32 as well as all of the components necessary for controlling inflation, including the compressed gas source 34. An adjustable valve 34a couples compressed gas to another quarter-turn valve 34b through a gas pressure regulator RG and conduit 34c. A conduit 4d and elbows 34e, 34f couple compressed gas to pipe 34g which extends downwardly through protective conduit 34h.

FIG. 5b shows the inflatable member 32 in the deflated and folded state arranged within a tubular housing 36. The circular-shaped upper end of the inflatable member 32 is arranged to lie over the top surface of cylindrical member 36 and is compressed between the top edge of cylindrical member 36 and a disc-shaped member 38, together with an O-ring 40 which enhances the airtight seal between disc-shaped member 38 and inflatable member 32. A circular groove of a depth less than the diameter of O-ring 40 may be provided for seating O-ring 40.

Figure 5:
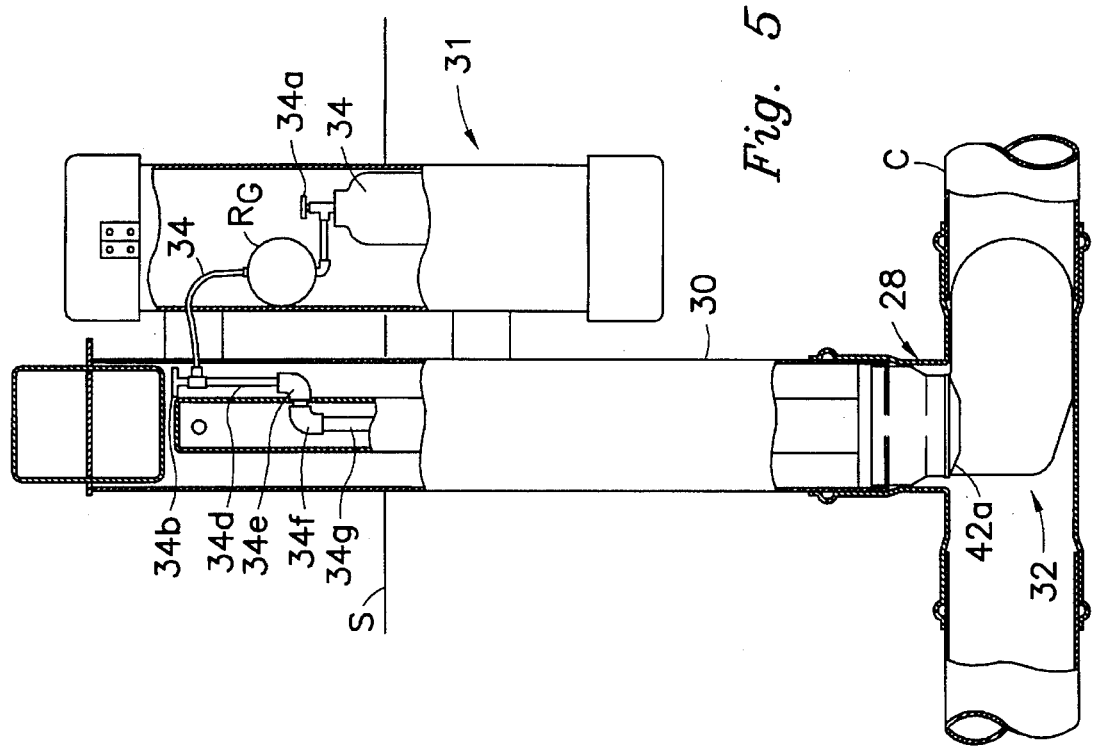
FIG. 5 shows an elevational view, partially sectionalized of another fluid blockage system, incorporating the principles of the present invention.
Figure 5A:
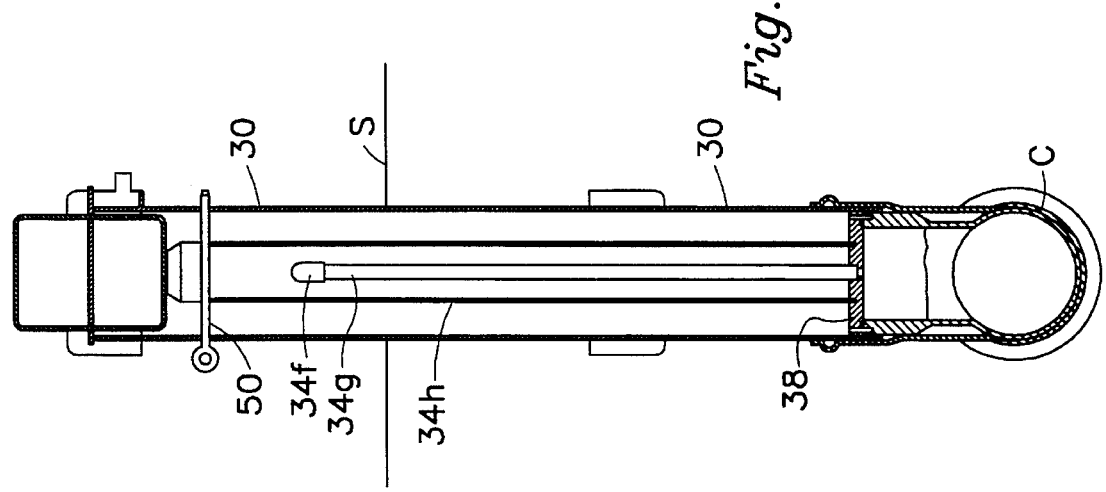
FIGS. 5a shows a sectional view of the embodiment of FIG. 5.

A vinyl diaphragm 42 extends across the bottom circular-shaped surface of cylindrical housing 36 to protect the folded deflated member 32 from damage or contamination due to mildew, insects, or the like. Diaphragm 42 has thinned lines which are tear lines. When the inflatable deploys, the diaphragm tears at these thinned lines which are arranged in a three-way cross "*". FIGS. 5 and 5c show a portion 42a of the diaphragm 42 which has broken away from another portion or portions (not shown) upon inflation of member 32.

Compressed gas introduced through coupling 44 passes downwardly through regulator RG, quarter-turn valve 34b and an opening in disc-shaped member 38 to inflate member 32 from the deflated, folded state shown in FIG. 5b to the fully inflated state shown in FIGS. 5 and 5c. Urethane diaphragm 42 easily breaks away from the inflatable member during inflation. The inflatable member fills the interior of conduit C blocking fluid flow therethrough and assumes an L-shaped or boot-shaped configuration. In the deflated, folded state, member 32 is substantially totally removed from conduit C so as to totally avoid providing any restriction to normal fluid flow.

Manual deployment of the inflatable member 32 may be performed by cutting away or breaking a strap (not shown) fastening cover member 52 to housing 30 and removing cover member 52 to gain access to quarter-turn valve 34b. The valve is opened, causing compressed gas within cylinder 34 to be released to fill inflatable member 32. Shaft 50 prevents the inflation components from being urged upwardly due to the release of compressed gas from cylinder 34. The member 32 may be automatically deployed using control circuitry shown in FIGS. 8–8c, for example.

The inflation member of FIG. 5 may be retrofitted to an existing pipe by using a "saddle T" 41 shown in FIG. 5d being retrofitted to conduit C and thus avoiding the need for removing and replacing the conduit C with a T-coupler. The saddle T 41 is held against the outer periphery of conduit C by clamps 41a, 41b.

Figure 6:
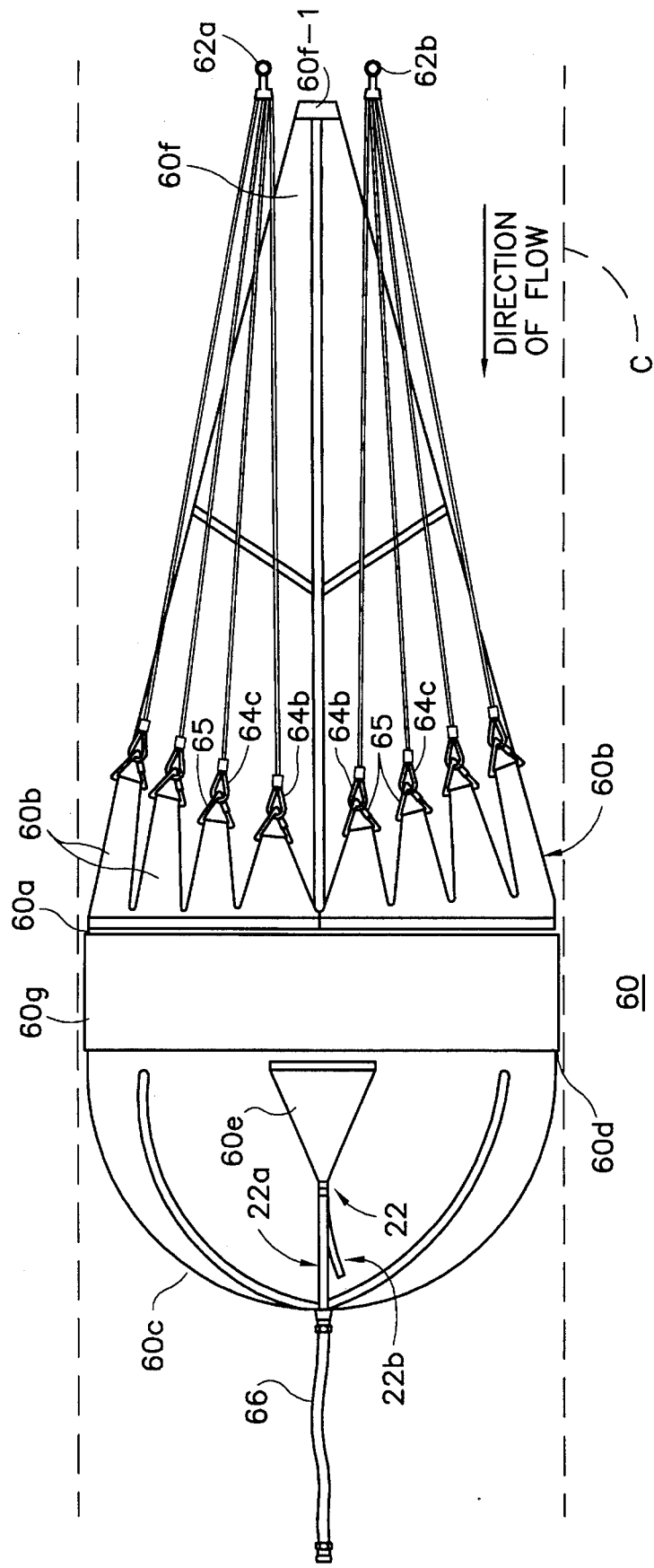
Figure 6A:
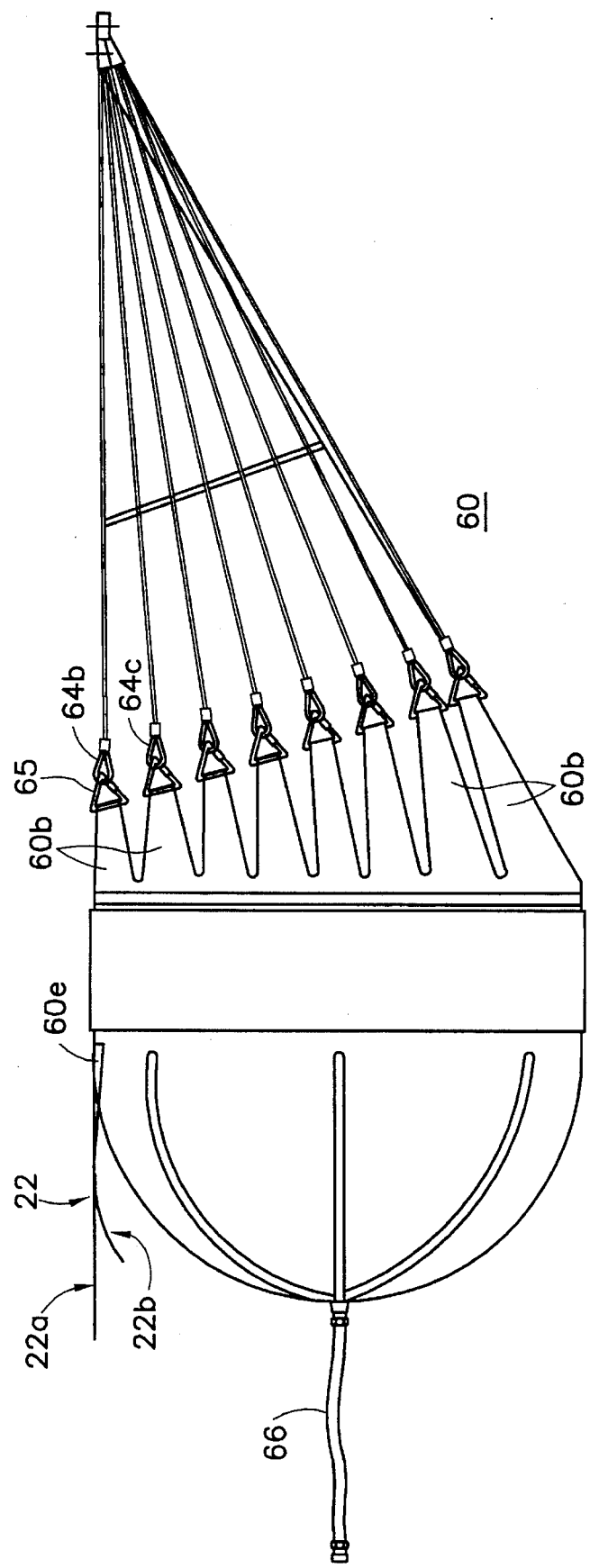

FIGS. 6, 6a and 6b respectively show top, side elevational and partial front views of still another embodiment 60 of an inflatable member similar to the embodiment of FIG. 3 and setting forth the details of an anchoring system for securing the inflatable member 60 to a conduit. Member 60 is comprised of a cylindrical-shaped central portion 60a. The upstream or left-hand end of the inflatable, substantially is connected to a pair of anchor bolts 62 by a plurality of cable assemblies 64. Each cable assembly, as shown in FIG. 6c, comprises a wire rope 64a formed in a loop at each end 64b, 64c. Thimbles 64d, 64e define and maintain the shape of each loop. Sleeves 64f, 64g secure each loop about its associated thimble. Sleeve 64h is employed to form a loop 64i at a midpoint of wire rope 64a. The loops 64b, 64c of each cable assembly 64 are each linked with an associated delta chain connector 65. Each delta connector 65 is linked to an anchor tab 60b. The anchor tabs 60b are integrally joined to the intermediate, cylindrical-shaped section 60a of embodiment 60.

The tabs 60b, connectors 65 and cable assemblies 64 are divided into right-hand and left-hand groups. The left-hand groups are anchored to a conduit C (see FIG. 6) by means of an anchor bolt assembly 62a while the right-hand group is anchored to conduit C by anchor bolt assembly 62b. Each anchor bolt assembly 62a, 62b joins a plurality of cables 64, extending through the loops 64h of associated cables. The downstream end is coupled to conduit C by a strap 22a and adjustable buckle 22 similar to that shown in FIG. 3. Buckle 22 is joined to rear support tab 60e having its right-hand end joined to the hemispheric-shaped portion 60c.

A threaded stud ST is epoxied into a hole drilled into conduit C and extends into the interior of conduit C, a plurality of loops 64i (see FIG. 6c) are arranged between washers W1 and W2. Bushing B acts as a spacer and extends through the centers of loops 64i. Hex nut N1 and jam nut N2 secure loops 64i to threaded anchor stud ST. A tear-away vermin bag VB surrounds the cable loops 64i and is sandwiched between washers W1 and W2. Anchor bolts 62a and 62b are spaced apart a width greater than the width of the folded over end 60f-1 of the free-floating oblique conical portion 60f so that the inflatable member is not interfered with by or damaged by the cables 64.

Hemispheric-shaped downstream section 60c is joined to the downstream or right-hand end of the cylindrical-shaped inflatable section 60a along a continuous seal 60d. An oblique conical-shaped inflatable section 60f is secured to the opposite end of cylindrical-shaped section 60a. Hemispheric-shaped portion 60c is joined to a filling tube 66 having a fitting 66a, providing a gas-tight coupling with a filler tube such as tube 18 coupled with a compressed gas source shown, for example, in FIGS. 1a and 1b. Tube 66 is mounted at the center of hemispheric-shaped portion 60c by a mounting assembly including a flanged post 66b, a fitting 66c and a clamp 66d.

Tube 66 communicates with the interior of inflatable member 60 to inflate member 60 with compressed gas.

The oblique conical-shaped portion 60f is not anchored to conduit C and is free-floating.

In use, the inflatable member 60 is maintained near the top of conduit C in a deflated, folded state having much the appearance of member 12 shown in FIGS. 1a and 1b.

Figure 6D:
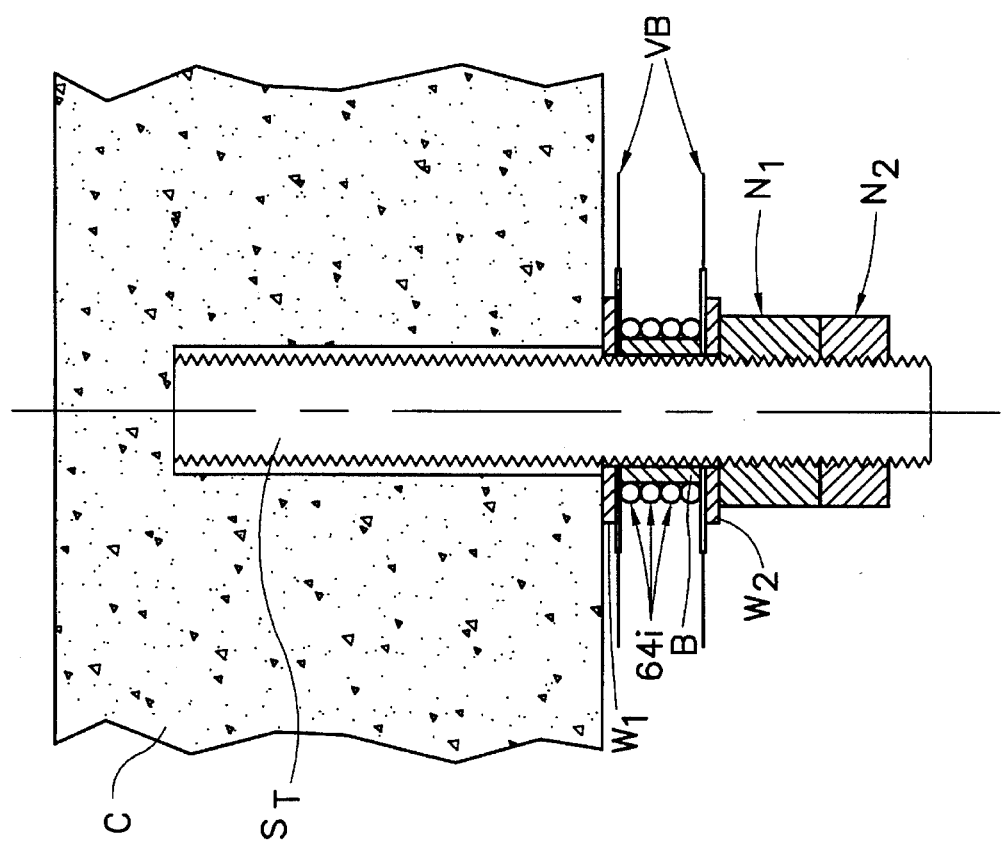
FIG. 6d shows an elevational view of one of the anchor bolt assemblies of FIG. 6.
Figure 6E:
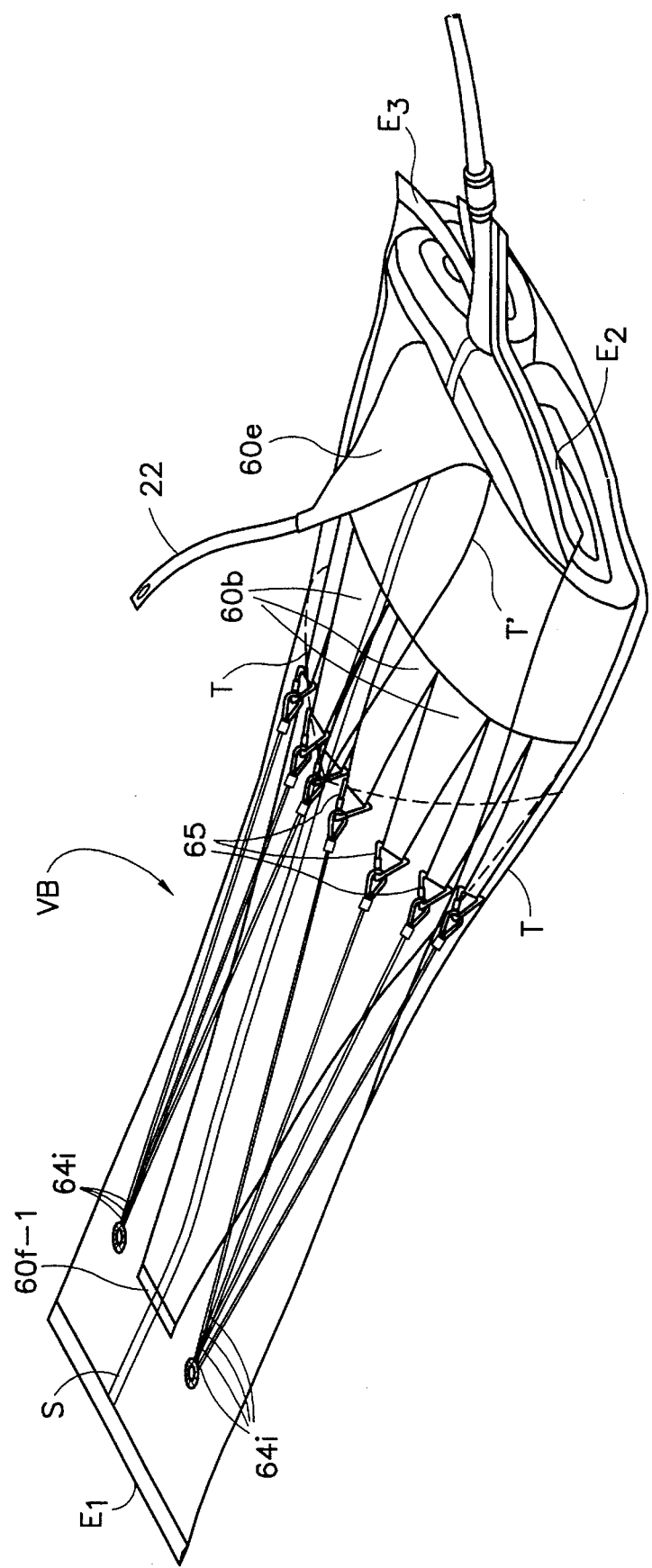
FIG. 6e is a perspective view of a tear-away enclosure for an inflatable member.

As shown in FIG. 6e, the inflatable member 60 is housed within a transparent tear-away vermin bag VB. The vermin bag is formed from a flat sheet folded over to form a cylindrical sleeve and is joined along a seam S extending along the longitudinal axis of the bag. Weakened lines or "tear lines" T and T' are provided on top and bottom sides of the bag. The tear lines on the top of the bag are seen in FIG. 6e while the tear lines on the bottom side are hidden from view.

The inflatable member 60 is rolled up and placed in the bag. The left-hand end E1 is folded over and sealed. The right-hand end is folded over and sealed forming two L-shaped seams E2, E3. The tube 66 and fitting 66a extend beyond the seals E2, E3 for connection with tube 18 (see FIGS. 1a, 1b).

The tab 60e extends through a slit in the bag.

The loops 64i, bushing B and washers W1, W2 (see also FIG. 6d) form a unitary assembly held together by a suitable epoxy or glue. Holes are pierced in the bag by threaded studs ST to hold the loops 64i and bag in place and anchored to conduit C.

Upon receiving an alarm signal, compressed gas is released, rapidly inflating member 60. The tear lines of reduced thickness (for example, the tear lines may be formed by scoring the bag) creates a stress concentration area. The load on the bag material builds until the stress at the tear lines exceeds the strength of the reduced areas, initiating tearing.

The placement of the tear lines causes the bag to be pulled away from the seal area 60a of inflatable 60. The bag, being attached at the anchors 62a, 62b and at the inlet port is torn away from the mid-portion since it is much smaller than the inflatable 60 when fully deployed.

The bag is also attached to the inflatable 60 at the tab 60e which extends through a narrow slit in the bag. One tear line T' runs along the top of the bag to the support tab slit. This tear line is stress to tearing, allowing the bag to pull away from support tab 60e toward the inlet port 66.

The outer periphery of section 60a, which is provided with a compressible gasket 60g, firmly presses against the interior periphery of conduit C during inflation even during a flow along conduit C, sealing the conduit.

FIGS. 7a through 7e show a "parachute-type" inflatable member 60' similar to inflatable 60 of FIG. 6 except that the inflatable 60' is hollow. Like elements of embodiments 60 and 60' are designated by like numerals and their description will be omitted herein for the sake of brevity.

The oblique conical-shaped portion 60f of embodiment 60 is omitted in inflatable 60' and the interior of cylindrical-shaped portion 60 is provided with an inflatable, hollow toroidal-shaped portion 60h coupled to a compressed gas source through tube 66.

Upon release of compressible gas, the toroidal-shaped portion inflates to the shape shown in FIGS. 7d and 7e causing the member 60' to assume the erected shape shown in FIGS. 7–7c, from a folded, stowed state within a vermin bag of the type shown in FIG. 6e. The interiors 60h and 60e are hollow and they receive fluid flow passing through the open regions between cables 64, totally filling the interior space defined by the interior surface of inflated section 60h and hemispheric section 60c. The operation of member 60' very much resembles the operation of a parachute such that toroidal section 60h fills with compressed gas so that its outer surface conforms to the interior surface of the conduit in which it is deployed, blocking the flow of water between the outer surface of portion 60a and the interior surface of the conduit. Thus, fluid flowing downstream toward section 60f fills the interior region defined by hemispheric section 60c and toroidal section 60f filling the region therein, thereby directly contributing to the effective blockage of fluid flow. Cable assemblies 64 and strap 22a serve principally as a means for stabilizing the orientation of sections 60a and 60c, and especially section 60a. The embodiment 60' effectively blocks over 90 percent of fluid flow even if its toroidal section is not fully inflated, the flow of fluid into the hollow interior of 60' serving to maintain inflatable 60' in the deployed state. Thus, the toroidal section need only be inflated sufficient to tear-away the bag and at least partially deploy inflatable 60'.

Figure 8:
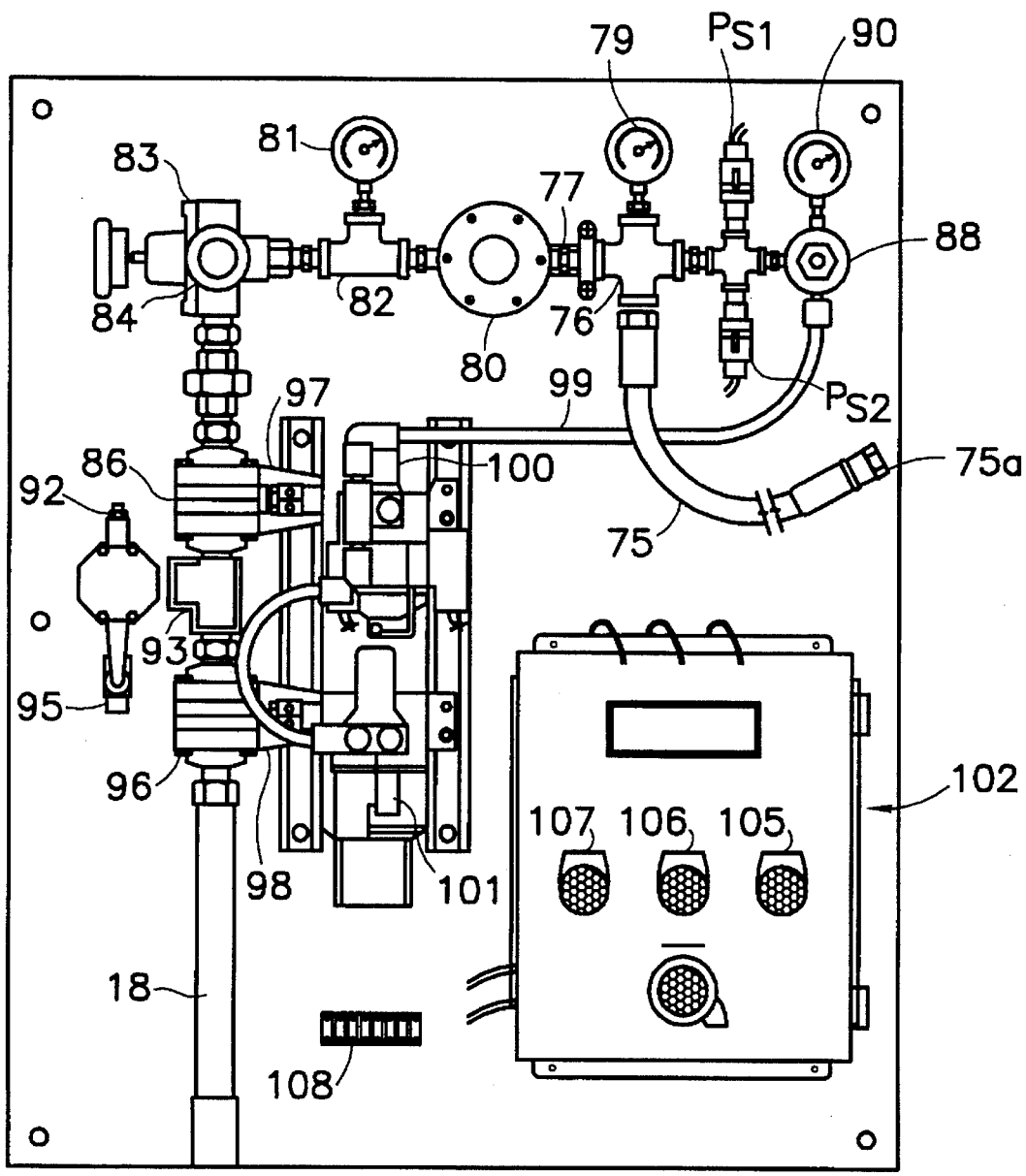
FIG. 8 shows a view of the pneumatic and electrical controls arranged within the housing 14 of FIG. 1, for example.
Figure 8A:
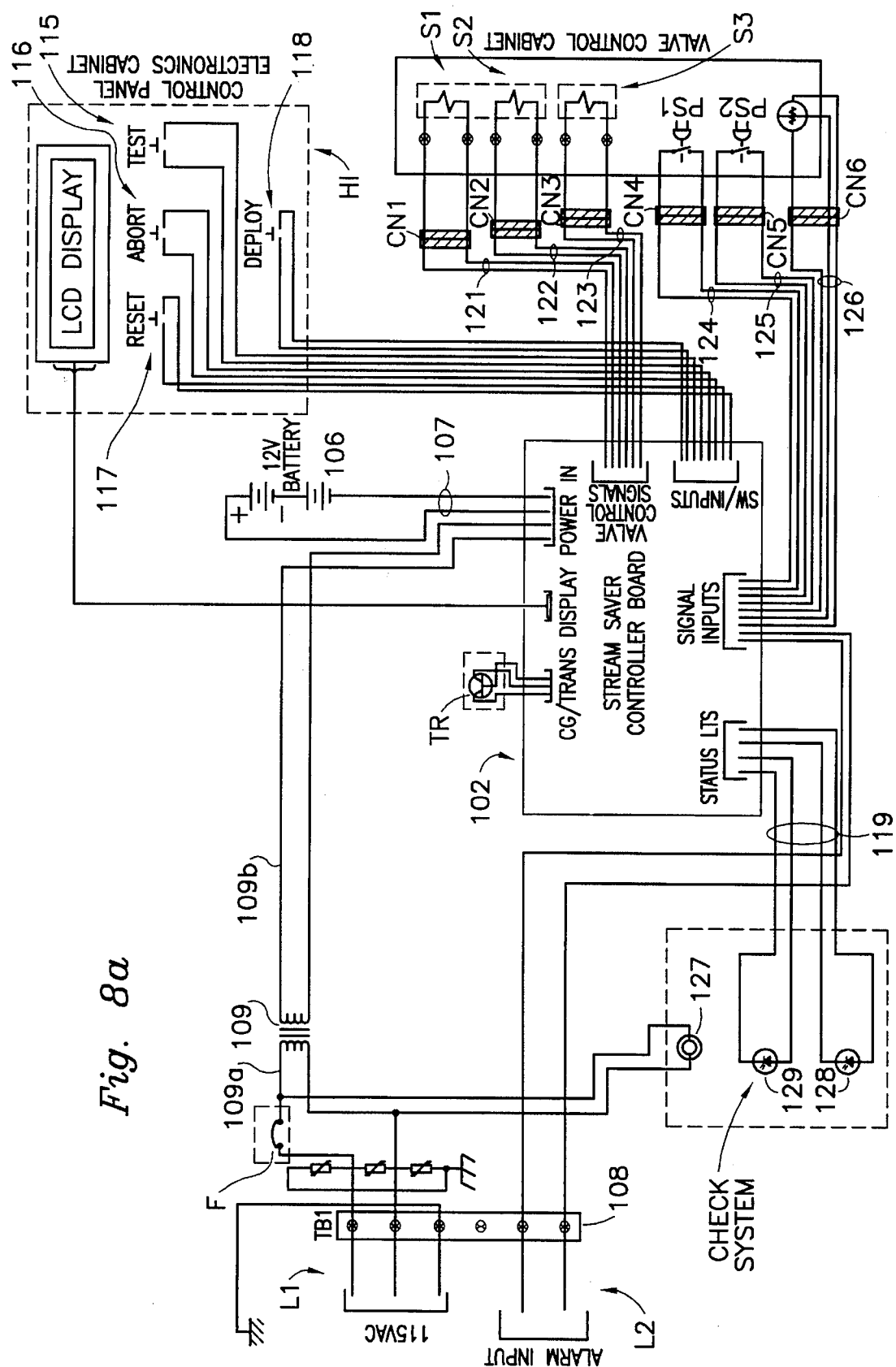
FIG. 8a is an electrical wiring diagram showing the electrical connections between and among the components of FIG. 7.

FIG. 8 shows an inflation system for controlling the inflatable member such as shown, for example, in FIG. 3.

FIGS. 8a and 8b-1 and 8b-2, taken together, respectively show a system wiring diagram and a circuit board schematic for the electronic portion of the system shown in FIG. 8.

Figures 1, 8B:
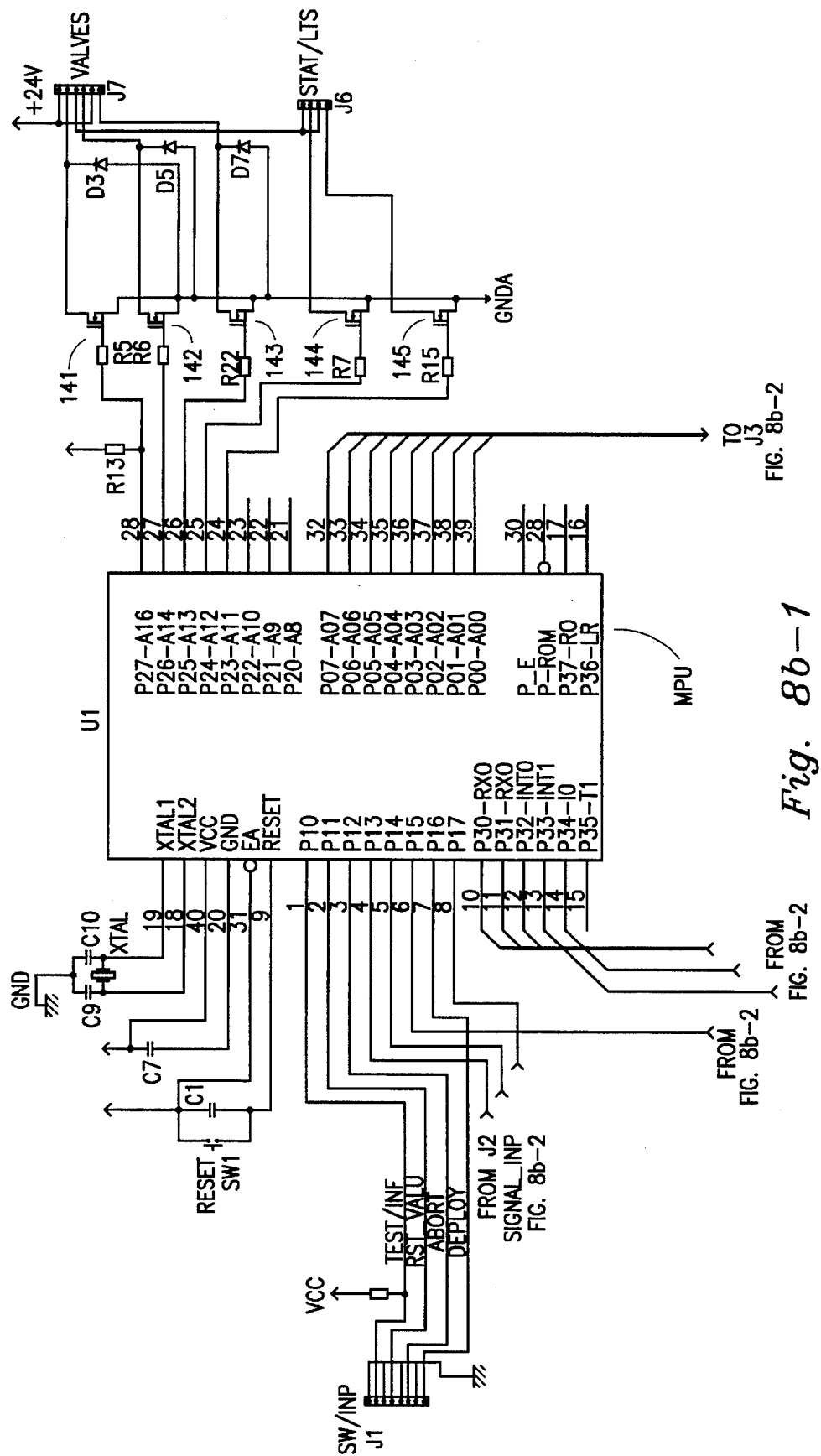
FIGS. 8b-1 and 8b-2, taken together, show a schematic diagram of the CPU and related circuit components employed in the electrical control circuitry of FIG. 7.
Figures 2, 8B:
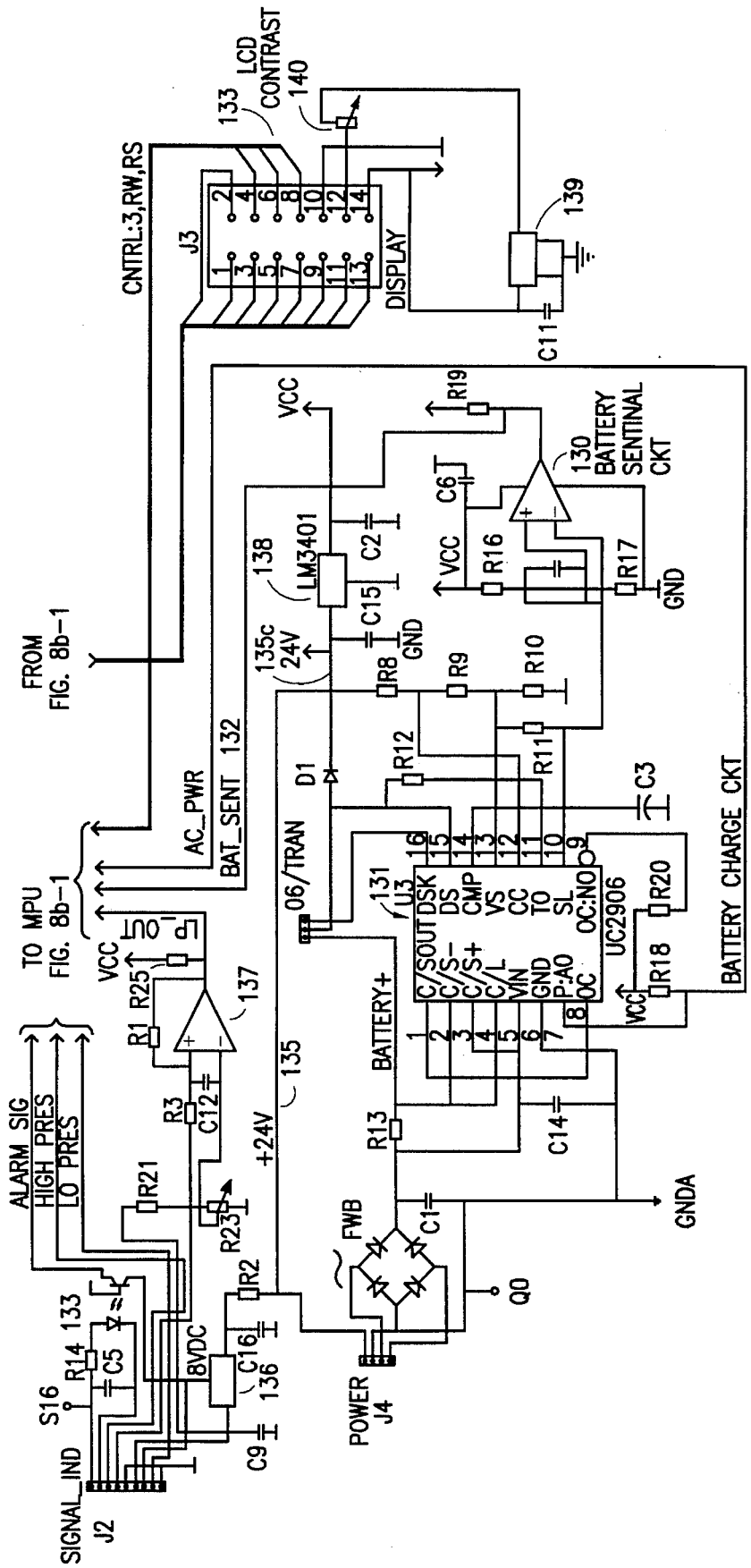
Figures 1, 9:
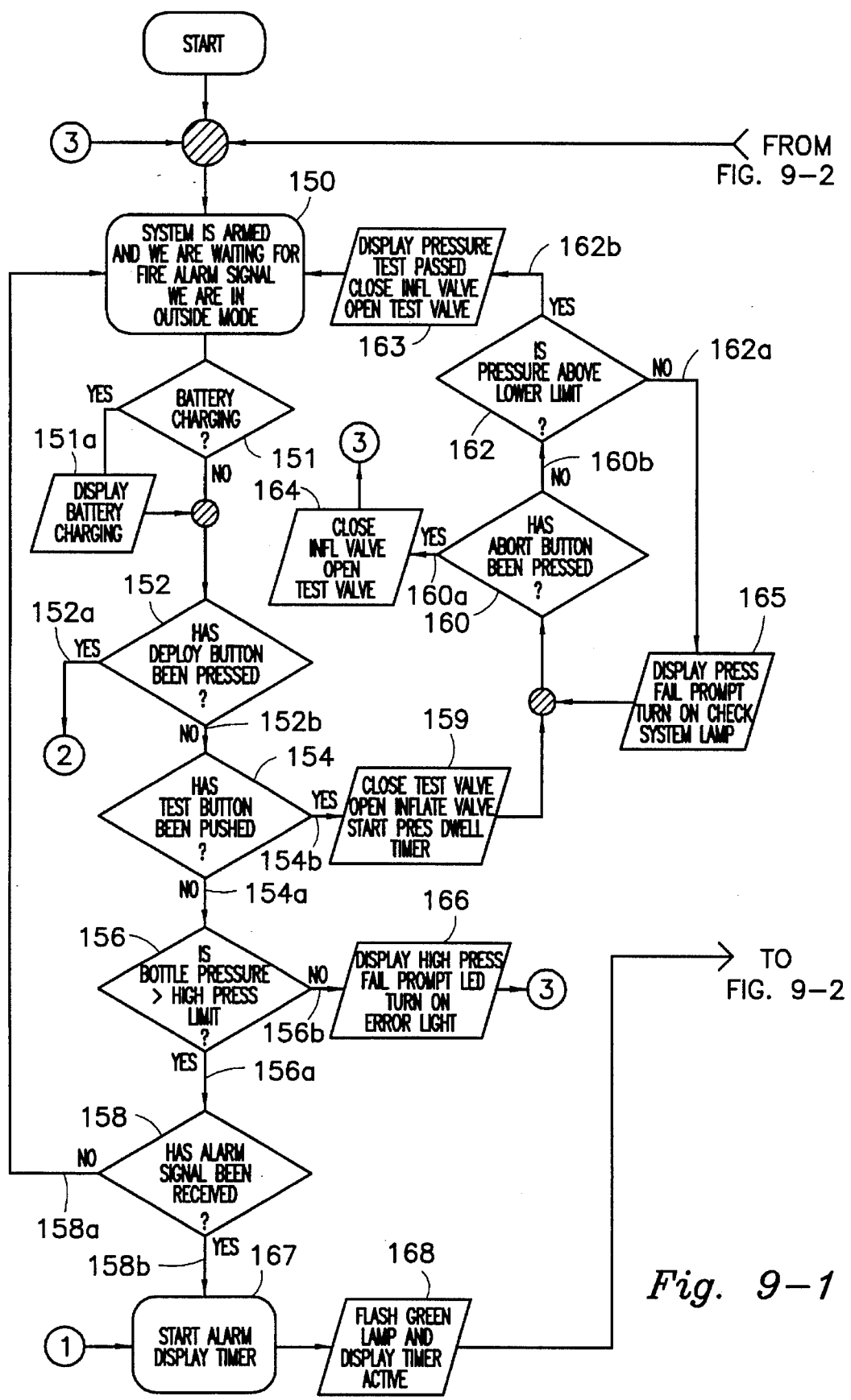

FIGS. 9-1 and 9-2, taken together, comprise a flow diagram showing the manner of operation of the system of FIG. 8 for controlling the inflatable member in accordance with a stored program.

FIGS. 8–8b-2 show a system 70 for connection to a suitable compressed gas source (not shown) positioned outside the enclosure 14 (see FIG. 1). The enclosure is open in FIG. 8 to expose the contents thereof. The compressed gas source may be a gas generator of the type employing sodium azide, ammonium nitrate or other chemistries. Alternatively, gas generators with coolants (hereinafter cool gas generators) employing $CO_2$, ammonia, Freon or water may be employed. Alternatively, $CO_2$ cylinders or $CO_2/GN_2$ cylinders or compressed $N_2$ or air cylinders (2000 PSIG) may be utilized. In the preferred embodiment, the gas source is a compressed gas cylinder containing $N_2$ at 2000 PSIG. The cylinder is provided with a valve operated outlet 74 (see FIG. 1a) which may be manually opened, closed, or partially opened. Main flow passes through coupler 75a and conduit 75 and is branched by a coupler 76 to a main branch path 77 and a 2000 PSIG gauge 79. Coupled to main branch path 77 is a first stage high flow regulator 80 for reducing pressure of the compressed gas down to 700–750 PSIG. Gauge 81 detects the pressure level at the outlet of regulator 80, being coupled thereto by a T-coupler 82.

A second stage high flow regulator 83 is coupled to the downstream end of T-coupler 82 and reduces gas pressure in the main flow branch 77 to 15 PSIG. Pressure at the outlet of second stage regulator 83 is observable by gauge 84 which monitors regulator 83.

Compressed gas at 15 PSIG is coupled to main valve 86.

Coupler 76 further couples compressed gas from conduit 75 to low flow regulator 88 through coupler 87. Regulator 88 reduces the compressed gas from source 72 to a level of the order of 100 psig. Gauge 90 monitors the pressure at the outlet end of regulator 88. Pressure switches PS1 and PS2 detect high and low pressure levels (1900 PSIG and 150 PSIG). Their leads extend into the electronic circuitry within enclosure 102.

Figure 8C:
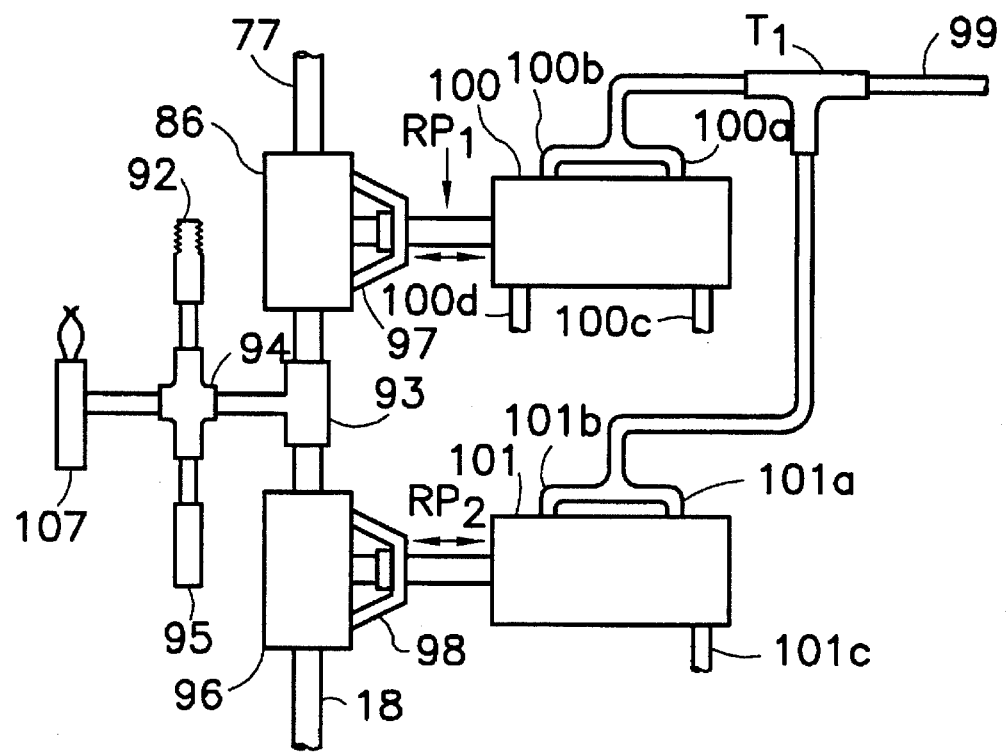
FIG. 8c shows a portion of the controls in FIG. 8 in greater detail.

The downstream end of valve 86 is coupled to a 16 psig. relief valve 92, a manually operable bleed valve 95 and a test close-off valve 96 by means of a coupler 93 and another coupler 94 beneath transducer 107, shown in greater detail in FIG. 8c.

The downstream end of valve 96 is coupled to conduit 18 which is preferably a flexible hose extending through a PVC pipe 16 (note also FIGS. 1a and 1b) and enters into conduit C for delivering compressed gas to the inflatable member through input coupling 20.

Valves 86 and 96 are similar in design and operation and each respectively has a pneumatic operator 97 and 98 for controlling opening and closing of the valve. Operators 97 and 98 are similar in design and function. Branch conduit 99 couples compressed gas at a reduced pressure to electrically operated solenoid-operated spool valves 100 and 101 by means of low flow regulator 88 which reduces the pressure of the compressed gas in branch path 99 to 100 PSIG.

The compressed gas in conduit 99 is coupled in parallel to spool valves 100 and 101 through coupler T1, as shown in greater detail in FIG. 8c. Each spool valve receives compressed gas at two inlet ports 100a, 100b and 101a, 101b. Solenoids (not shown) in spool valve 100 (connected to the electronics in 102 by wires 100c, 100d) control the compressed gas flow. When inflation is initiated, the solenoid controlled by leads 100d cause spool valve 100 to move a rack and pinion mechanism RP1 to the right, opening the ball valve mechanism 97 of valve 86. To close valve 86, the solenoid operated by leads 100c is energized causing spool valve 100 to move RP1 to the left to close the ball valve mechanism of valve 86.

Valve 96 operates in the same fashion to close the valve. However, valve 96 is normally spring biased toward the open position and operation of the opening solenoid is omitted. Valve 96 is closed to perform test routines to be more fully described without the need to inflate member 60.

Considering FIGS. 8, 8a and 8b-1, 8b-2, the electrical portion of the control system is comprised of a battery 106 coupled to the circuitry enclosed within housing 102 by wires 107 through jumper J4.

Lines L1 and L2 (see FIG. 1a) enter into enclosure 14 and are coupled to a terminal block 108. AC power is coupled to AC transformer 109 through leads 109a. The output of AC transformer 109 is coupled to the electrical circuitry 102 by leads 109b. Metal-oxide varistors MOV1, MOV2 and MOV3 are provided for lightning protection. Fuse F is provided for overload protection.

DC power is coupled through terminal block 108 to circuit board 102 by leads 105. Incoming DC power, in one preferred embodiment, is preferably a 24 VDC signal which may be derived from a variety of sources such as an upstream sensor detecting the presence of a contaminant, a fire or disaster, alarm, etc.

Test, abort, reset and deploy buttons 115, 116, 117 and 118 are mounted in the door to housing H1. Signals from the circuit board 102 are coupled to indicator lamps 128, 129 (see FIGS. 8b-1, 8b-2) on the enclosure door by means of leads 118. Drive signals from the circuitry within 102 are coupled to solenoids S1, S2 and S3 by leads 121, 122 and 123. The states of pressure monitor switches PS1, PS2 and PS3 are conveyed to circuitry 102 by leads 124, 125 and 126. Connectors CN1–CN6 provide for easy removal and replacement of the solenoids and switches. The LCD display 133 is coupled to the control electronics through jumper J3. Current transistor TR is coupled between the battery charging circuit 131 and the battery by jumper J6. Transistor TR is mounted outside of the cabinet to improve heat dissipation.

Lamp 127 is normally on and turns off either in the absence of AC power or if fuse F blows.

Lamp 129 is lit if there is a failure or problem in the stream saver system that should be checked as will be described.

Lamp 128 lights when the inflatable member is deployed.

The test, rest, abort and deploy push-button switches are coupled to the microprocessor MPU through jumper J1.

The alarm signal (24 VDC—see FIG. 8a) and the pressure signals (high and low pressure) are coupled to the MPU through J2.

AC power is coupled to the battery charging circuit 131 through J4 and full-wave bridge FWB. A 24 VDC line 135 is coupled to the input voltage terminal of transducer 107 (see FIGS. 8 and 8a) through regulator 136 and jumper J2. The signal of transducer 107 is coupled through J2 to a comparator circuit 137 to compare the pressure reading at the downstream end of valve 86 with a reference level. The result of the comparison is coupled to the MPU.

The battery charging circuit controls the current flow to the battery (for charging purposes) by controlling the base electrode of transistor TR which controls the charging current applied to the battery 106.

The 24 VDC output line 135a from the battery charging circuit is coupled to a voltage regulator 138 which steps the voltage down to a regulated 5 VDC for operation of the MPU and related circuitry shown in FIGS. 8b.

The LCD display 133 is coupled to a regulator 139 which provides −5 VDC for LCD contrast control, applied to the LCD display through potentiometer 140. Display 133 displays two lines of sixteen (16) characters per line.

The inflate, reset and test solenoids are controlled by MOSFETS 141–143 respectively. The gate of each MOSFET is controlled by the MPU. When turned on, the MOSFET selectively couples one terminal of the associated solenoid to ground through jumper J7. 24 VDC is coupled in common to the other terminal of each solenoid through jumper J7. The conducting MOSFET controls its associated solenoid. The MOSFETS 144, 145 selectively light the deploy and check system lamps 128, 129 (see FIG. 8a) in a similar fashion under control of the MPU.

FIG. 8b-1, 8b-2 show the circuit components provided in circuitry 102 which comprises a microprocessor MPU, a battery charging circuit 131 and a battery sentinel circuit 130.

The system operation is as follows:

Making reference to the flow diagram of FIG. 9-1, 9-2, at 150 the system is armed and awaits receipt of an alarm signal. This is referred to as the sentinel mode. At this time the MPU repetitively loops through a group of monitoring activities. More specifically, at 151 the battery charger is checked. If the battery is charging, a battery charging prompt is displayed by LCD display 133. If not, the system branches to 152 where the system looks for the presence of deploy button operation (switch 118—FIG. 8a). If switch 118 is operated, the program branches at 152a to step 171 to energize the valve driver circuitry for inflation causing the inflatable member 60, for example, to inflate by receiving compressed gas from a suitable gas source at 172.

If the deploy switch has not been operated, the system branches at 152b to determine if the test button has operated at 154. If not, the system branches at 154a to 156 to look at high bottle pressure of the gas source (switch PS1—FIG. 8). If the pressure is higher than the limit of the test switch, the system branches at 156a to look for an alarm signal at 158. If no alarm signal is present, the system branches at 158a returning to step 150. The steps in this loop are repeated until a branching conditions occurs which will take the system out of the aforementioned loop.

If the test button is operated at 154, the system branches at 154b to close the test valve (96—FIG. 8), open the main valve 86 and start a dwell timer at step 159. The dwell timer allows the system to settle to enable proper measurements to be taken.

At step 160 the abort switch (116—FIG. 8a) is examined. If it is operated, the system branches at 160a to close the valve 86 and open valve 96. The system then returns to step 150.

If the abort switch is not operated, the system branches at 160b to examine the low pressure switch at 163. If the pressure is not above the lower limit, the system branches at 162a and at 165 a failure prompt message is displayed by LED display 133 and the check system lamp 129 is also lit. The program then loops back to step 160.

If the pressure is above the lower limit the system branches at 162b to display a pressure test passed prompt on LCD 133, the inflate valve 86 is closed and the test valve 96 is opened, completing the test sequence at step 163 and then returns to step 150.

At step 156 if the bottle pressure is less than the high limit a branch is made at 156b, the high pressure fail prompt is displayed on LCD display 133 and the check system light 129 is lit. The system then returns to step 150 through 3—3.

At step 158 if an alarm condition is present, the system branches at 158b starting a delay timer at step 167 and flashing lamp 128 and displaying a display timer active prompt on the LCD display 133 at step 168.

When the inflatable 60 is inflated at 172, the green status lamp 128 is turned on (step 177) and the LCD 133 displays a stream saver deployed prompt (step 178). At step 179 the bottle pressure is examined. If pressure is low, the system branches at 179a to display a no bag make-up prompt on display 133 and closes inflate valve 86, at step 183 and, at step 184 looks for operation of the reset button (117—FIG. 8a). If the reset button has not been operated, the system branches at 184a and loops back to step 179. The closure of inflate valve 86 at step 183 limits loss of air in the bag through the bag itself.

If the reset button is operated, the system returns to step 150 through branch 184b and 3—3.

At step 179, if the bottle pressure is not low, step 180 is entered through branch 179b to look for operation of the reset button. If the reset button is operated, the program returns to step 150 through branch 180a and 3—3.

If the reset button has not been operated, inflation pressure is examined at step 181 through branch 180b. If inflation pressure is not low, the system reenters step 177 through branch 181a.

If inflation pressure is low, branch step 182 is entered through branch 181b to light the check system lamp 129 and display a low pressure inflation prompt on display 133 and then returns to step 184. At step 169, the system looks for operation of the abort button 116 (FIG. 8a), which aborts an inflate operation in the event of a false alarm.

If the abort switch has not been operated, the system branches at 169a and looks for expiration of the timer at 170. If the timer has elapsed, the system branches at 170a to perform step 171, described above.

If the timer has not expired, the system branches at 170b and repetitively loops through steps 169 and 170 until an operation occurs that removes the system from this loop.

If the abort button has been operated, the system branches at 169b to look for reset of the alarm condition at step 174. If the alarm condition is present, the system branches at 174a to restart the timer sequence by return to step 167 through 1—1.

If the alarm condition has been removed, the delay timer is reset through branch 174b and step 175 and, at step 176 the lamp 128 is turned off and the system returns to step 150.

Upon inflation of member 60, for example, (step 172) lamp 128 is turned on at step 177, and a stream saver deployed prompt is displayed on LCD display 133.

Figure 10:
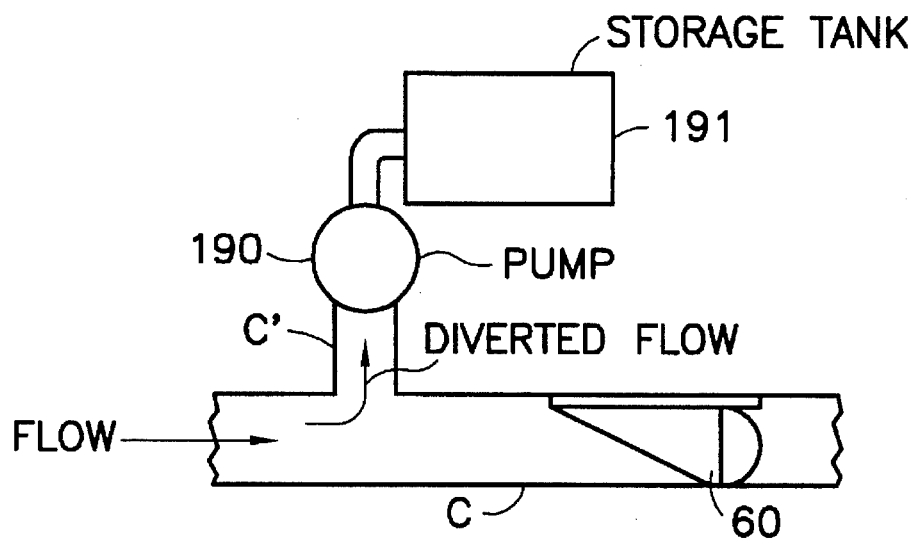
FIG. 10 is a simplified view of a flow diverter system usable with the inflatable members of the present invention.

In addition to blocking flow in conduit C, flow can be diverted simultaneously therewith by pumping the blocked flow through branch conduit C' into a storage tank or other suitable storage means shown in FIG. 10. Pump 190 is energized by the control system at the same time inflation of the inflatable member 60 is initiated.

The delay timer at step 167 (FIG. 9-1) may be set to a time which is related to the time at which a contaminated fluid flow occurring in the region of the alarm signal will reach the location of the inflatable member 12. If desired, the delay timer may be a very short interval or substantially instantaneous, depending on the particular application.

Nevertheless, upon deployment, the operation of the valve driver circuitry causes inflation to occur rapidly and depending upon system parameters, within a time range between two and eighty seconds and preferably between two and less than thirty seconds.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Apparatus for selectively blocking fluid flow in a conduit, comprising:

an inflatable enclosure arranged in said conduit and being normally deflated to minimize restriction of fluid flow through said conduit;

means for fixedly securing said inflatable enclosure adjacent to said conduit and retaining said inflatable enclosure in a deployed position ready for use;

means adjacent to said conduit for rapidly inflating said inflatable enclosure responsive to an inflation request;

said inflatable enclosure being folded to maintain a small profile when deflated to further minimize restriction of fluid flow through said conduit; and a protective enclosure formed of a material for normally retaining said inflatable enclosure in the folded condition when said inflatable enclosure is deflated, said protective enclosure comprising breakaway means for breaking apart said material protecting said inflatable enclosure to thereby enable the inflatable enclosure to inflate to an inflated condition;

a normal inflation pressure of said means for inflating being sufficient to provide a force to cause said inflatable enclosure to break apart said protective enclosure, thereby enabling the inflatable enclosure to inflate to an inflated condition sufficient to block fluid flow through said conduit.

2. The apparatus of claim 1 wherein said protective enclosure comprises at least one tube formed of said material covering a folded portion of said inflatable enclosure.

3. The apparatus of claim 2 wherein said breakaway means comprises:

a tubular-shaped member formed from a thin sheet of flexible material having elongated weakened portions extending along said sheet; and said tubular-shaped member surrounding an associated portion of the folded inflatable enclosure and breaking apart preferably along said weakened portions to enable said inflatable enclosure to be inflated sufficient to block fluid flow through said conduit.

4. The apparatus of claim 1 wherein said means for inflating comprises means for introducing a fluid under pressure into said inflatable enclosure for a small, predetermined time interval to inflate said inflatable enclosure to block said fluid flow.

5. The apparatus of claim 4 wherein said time interval is less than one minute.

6. The apparatus of claim 1 being further characterized by comprising a branch conduit located upstream relative to said inflatable enclosure;

a storage tank for storing a fluid; and pump means activated responsive to inflation of said inflatable enclosure for diverting fluid upstream relative to said inflatable enclosure into said storage tank to remove said fluid from said conduit for subsequent treatment and/or disposal.

7. The apparatus of claim 1 wherein said protective enclosure material is provided with perforations to facilitate breaking away of said protective enclosure from said inflatable enclosure.

8. The apparatus of claim 1 wherein said material of said protective enclosure is chosen to break apart when said inflatable enclosure is inflated.

9. Apparatus for selectively blocking fluid flow in a conduit, comprising:

inflatable enclosure arranged adjacent to said conduit and being normally deflated to minimize restriction of fluid flow through said conduit;

enclosure for fixedly securing said inflatable means to said conduit and retain said inflatable enclosure in a deployed position in readiness for use;

means adjacent to said conduit for rapidly inflating said inflatable enclosure responsive to an inflation request;

said conduit being provided with an opening;

a hollow member joined to said opening and extending away from said conduit; and said inflatable enclosure being contained within said hollow member when in the folded state and extending through said opening and expanding into said conduit when inflated to block fluid flow through said conduit.

10. The apparatus of claim 9 wherein said conduit and said hollow member are tubular members joined to one another and aligned to form a substantially T-shaped configuration.

11. Apparatus for selectively blocking fluid flow in a conduit, said apparatus comprising:

an inflatable enclosure having a default deflated state and an inflated state;

means for fixedly securing said inflatable enclosure adjacent to said conduit and retaining said inflatable enclosure in a position ready for use; and means adjacent to said conduit for rapidly inflating said inflatable enclosure responsive to an inflation request;

said inflatable enclosure comprising a thin, flexible, foldable sheet material confining an enclosed space represented by a first volume when in said inflated state and foldable to a second volume, said second volume being no greater than one-half said first volume;

said inflatable enclosure having a central portion and end portions integrally joined to said central portion along opposite axial ends thereof, said central portion having a cylindrical shape when said inflatable enclosure is in said inflated state, and at least one of said end portions having a conical shape when said inflatable enclosure is in said inflated state, a substantial portion of one side of said conical shape touching an inner wall surface of said conduit.

12. The apparatus of claim 11 wherein said second volume is between one-tenth and one-half of said first volume.

13. The apparatus of claim 11 wherein said means for inflating is located at a position outside of said conduit, a tubular member extending between said means for inflating and said enclosure opening; and said conduit having an opening, said means for inflating having a tubular coupling member extending through said tubular member and said opening.

14. The apparatus of claim 13 wherein said inflatable member assumes an L-shaped configuration when inflated.

15. The apparatus of claim 11 wherein said conical-shaped portion has a central axis which is oblique to a central axis of said cylindrical-shaped portion whereby an elongated surface portion of said cylindrical-shaped portion and an elongated surface portion of said conical-shaped portion lie in a common plane.

16. The apparatus of claim 15 wherein both of said elongated surface portions are positioned adjacent to and in contact with an interior surface of said conduit which is substantially parallel to a longitudinal axis of said conduit.

17. The apparatus of claim 11 wherein said enclosure has a central portion and end portions integrally joined to said central portion along opposite axial ends thereof;

said central portion having a cylindrical shape when inflated;

said enclosure being further provided with first and second projections extending from opposing ends of said cylindrical-shaped portion in respective opposing upstream and downstream directions; and said means for securing comprising means coupling the free ends of said projections to said conduit.

18. The apparatus of claim 17 wherein at least one of said projections comprises a plurality of support cables coupled between said conduit and said enclosure.

19. The apparatus of claim 18 wherein said cables substantially at least partially surround a central portion of said inflatable enclosure.

20. Apparatus for selectively blocking fluid flow in a conduit, comprising:

inflatable enclosure arranged in said conduit and being normally deflated to minimize restriction of fluid flow through said conduit;

means for fixedly securing said inflatable enclosure to said conduit and retain said inflatable enclosure in a deployed position in readiness for use;

means adjacent to said conduit for rapidly inflating said inflatable enclosure responsive to an inflation request;

said inflatable enclosure further comprising an inflatable portion defining a toroidal-shaped hollow enclosure when inflated and having an opening coupled to an output of said means for inflating and having a cylindrical-shaped surface portion engaging an interior surface portion of said conduit when inflated;

a hemispheric-shaped portion joined to a downstream end of said toroidal-shaped enclosure and having a hollow interior portion;

a first coupling means coupled to a downstream end of said enclosure and extending in an downstream direction away from said enclosure;

said first coupling means including means for securing one end of said first coupling means to said conduit;

a plurality of second coupling means each having a first end coupled to an upstream end of said enclosure at spaced angular intervals about said enclosure and a second end anchored to said conduit; and said hemispheric-shaped portion being filled with fluid flowing along said conduit and through a center opening of said toroidal-shaped portion when said toroidal-shaped portion is at least partially inflated.

21. The apparatus of claim 20 wherein said second coupling means comprises a plurality of cables which are spaced apart from one another to enable fluid to flow between said cables and into said hollow enclosure.

22. Apparatus for selectively blocking fluid flow in a conduit, comprising:

inflatable enclosure arranged in said conduit and being normally deflated to minimize restriction of fluid flow through said conduit;

means for fixedly securing said inflatable enclosure to said conduit to retain said inflatable enclosure in a deployed position in readiness for use;

means adjacent to said conduit for rapidly inflating said inflatable enclosure responsive to an inflation request;

wherein said inflatable enclosure further comprises an inflatable portion defining a toroidal-shaped hollow enclosure when inflated and having an opening coupled to an output of said means for inflating and having a cylindrical-shaped surface portion engaging an interior surface portion of said conduit;

a hemispheric-shaped portion joined to a downstream end of said toroidal-shaped enclosure and having a hollow interior;

first coupling means coupled to a downstream end of said enclosure and extending in a downstream direction away from said enclosure;

said first coupling means including means for coupling said first coupling means to said conduit;

a plurality of second coupling means each having a first end coupled to an upstream end of said enclosure at spaced angular intervals about said enclosure and a second end joined to said conduit; and said hemispheric-shaped hollow portion being filled with fluid flowing along said conduit and through a center opening of said toroidal-shaped portion when said toroidal-shaped portion is at least partially inflated.

23. Apparatus for selectively blocking fluid flow in a conduit, comprising:

an inflatable enclosure arranged in said conduit and being normally deflated to minimize restriction of fluid flow through said conduit;

means adjacent to said conduit for rapidly inflating said inflatable enclosure responsive to an inflation request;

said means for inflating further comprising a source of pressurized gas; and means for communicating said source to said inflatable enclosure responsive to an inflation initiation signal.

24. In combination, an inflatable enclosure and apparatus for controlling inflation of said inflatable enclosure arranged within a conduit for selectively blocking fluid flow therethrough comprising:

a source of pressurized gas;

means for conveying gas from said source to said inflatable enclosure;

valve means arranged in said conveying means;

battery operated electronic controlling means for operating said valve means responsive to an inflation initiation signal from a remote source.

25. The combination of claim 24 wherein said controller includes a microprocessor.

26. The combination of claim 24 further comprising means for dividing said gas flow from said source into first and second flow paths;

said first flow path including first pressure regulating means for delivering a main gas flow at a first pressure level;

said second flow path including second pressure regulating means for delivering a control gas flow at a second pressure level higher than said first level;

said valve means including passage means for delivering said main gas flow to said conveying means;

slidable means for selectively blocking said passage means when moved in a first direction and for unblocking said passage means when moved in a second direction;

control ports selectively and mutually exclusively receiving said control gas flow for respectively moving said slidable means in said first and second direction; and solenoid control means for selectively coupling said control gas flow to said first port responsive to an inflation initiation signal and for selectively coupling said control gas flow to said second port when said inflation initiation signal is terminated.

27. The apparatus of claim 25 being further characterized by comprising second valve means having passage means coupled between the passage means of said first valve means and said conveying means;

said second valve means including slidable means for selectively blocking said second valve means passage means when moved in a first direction and for unblocking the second valve means passage means when moved in a second direction;

biased means for normally biasing said slidable means in said second direction;

said second valve means having a control port for receiving said control gas flow for moving said slidable means in said first direction; and second solenoid control means for selectively coupling said control gas flow to the control port of said second valve means responsive to a test signal to enable tests to be performed upon the apparatus without inflation of said inflatable means.

28. Apparatus for selectively blocking fluid flow in a conduit, said apparatus comprising:

an enclosure comprising a sealed flexible outer wall, said enclosure comprising an inflated state and a deflated state in which said enclosure is folded to minimize restriction of fluid flow through said conduit;

means for fixing a position of said enclosure relative to said conduit and retaining said enclosure in a deployed position ready for use;

means adjacent to said conduit for rapidly inflating said enclosure to said inflated state in response to an inflation request, said enclosure in said inflated state exerting outward normal and tensile forces upon said flexible outer wall, causing said enclosure in said inflated state to assume a shape which prevents fluid from flowing through said conduit;

said enclosure in said inflated state comprising first and second end portions and a central portion integral with and positioned between said first and second end portions, said central portion comprising an outer periphery corresponding in size and shape to an opening defined by said conduit, said first end portion having a first longitudinally extending side extending along said opening formed by said conduit and a second longitudinally extending side opposite said first longitudinally extending side, said first longitudinally extending side being in contact with a first side of an inner surface of said conduit, said second longitudinally extending side being spaced from a second side of said inner surface of said conduit by a varying distance, said second side of said inner surface of said conduit being opposite said first side of said inner surface of said conduit.

29. The apparatus according to claim 28, wherein said inflated state comprises a fully inflated state, a total outer surface area of said flexible outer wall of said enclosure in said inflated state being substantially equal to a total outer surface area of said flexible outer wall of said enclosure in said deflated state.

30. The apparatus according to claim 29, wherein said first end portion comprises an apex, and wherein said distance between said second side of said inner surface and said second longitudinally extending side of said sealed flexible wall gradually varies from a smallest distance at a position near said central portion to a largest distance at said apex.

31. The apparatus according to claim 30, wherein said first longitudinally extending side is in continuous contact with said first side of said inner wall of said conduit from a point at which said first end portion meets said central portion to said apex.

32. The apparatus according to claim 28, wherein said first end portion comprises a cone, one side of said cone being in continuous contact with said first side of said inner wall of said conduit from a point at which said first end portion meets said central portion to an apex of said cone.

33. The apparatus according to claim 32, wherein said cone has a central longitudinal axis and said central portion has a central longitudinal axis, said central longitudinal axis of said cone being oblique to said central longitudinal axis of said central portion.

34. The apparatus according to claim 32, wherein said second end portion comprises a second cone, one side of said second cone being in continuous contact with said first side of said inner wall of said conduit from a point at which said first end portion meets said central portion to an apex of said cone.

\* \* \* \* \*